United States Patent
Zhou et al.

(10) Patent No.: US 10,736,115 B2
(45) Date of Patent: Aug. 4, 2020

(54) AIR INTERFACE RESOURCE DETERMINING METHOD AND APPARATUS AND AIR INTERFACE RESOURCE INDICATION METHOD AND APPARATUS

(71) Applicant: Huawei Technologies Co., Ltd., Shenzhen (CN)

(72) Inventors: Han Zhou, Shanghai (CN); Xiaolei Tie, Shanghai (CN); Meng Hua, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 91 days.

(21) Appl. No.: 15/939,857

(22) Filed: Mar. 29, 2018

(65) Prior Publication Data
US 2018/0227905 A1 Aug. 9, 2018

Related U.S. Application Data
(63) Continuation of application No. PCT/CN2015/091377, filed on Sep. 30, 2015.

(51) Int. Cl.
*H04W 72/04* (2009.01)
*H04W 72/14* (2009.01)
(Continued)

(52) U.S. Cl.
CPC ......... *H04W 72/048* (2013.01); *H04L 1/1614* (2013.01); *H04L 5/0055* (2013.01);
(Continued)

(58) Field of Classification Search
None
See application file for complete search history.

(56) References Cited

U.S. PATENT DOCUMENTS
2003/0169702 A1 9/2003 Ryu et al.
2011/0038344 A1 2/2011 Chmiel et al.
(Continued)

FOREIGN PATENT DOCUMENTS
CN 101841776 A 9/2010
CN 102194002 A 9/2011
(Continued)

OTHER PUBLICATIONS
"PCR TR45.820 NB M2M—Data Transmission and Retransmission", 3GPP TSG GERAN Adhoc#2 on FS_IoT_LC, Sophia-Antipolis, France, GPC150152, XP050945259, 3rd Generation Partnership Project, Valbonne, France (Apr. 20-23, 2015).

*Primary Examiner* — Lonnie V Sweet
(74) *Attorney, Agent, or Firm* — Leydig, Voit & Mayer, Ltd.

(57) ABSTRACT

The present application discloses an air interface resource determining method and apparatus. The method includes: obtaining a second index parameter sent by a network side device; generating a first index parameter according to a preset mapping rule, where the first index parameter is used to indicate an index of at least one air interface resource in an air interface resource set configured by the network side device; determining actual index information p according to the first index parameter and the second index parameter, where the actual index information is used to indicate an index of a target air interface resource in the air interface resource set; and obtaining the target air interface resource from the air interface resource set according to the actual index information, and using the target air interface resource as an air interface resource to be used by the user equipment.

17 Claims, 8 Drawing Sheets

(51) Int. Cl.
  *H04W 4/08* (2009.01)
  *H04W 4/70* (2018.01)
  *H04L 1/16* (2006.01)
  *H04L 5/00* (2006.01)
(52) U.S. Cl.
  CPC ............... *H04W 4/08* (2013.01); *H04W 4/70* (2018.02); *H04W 72/04* (2013.01); *H04W 72/042* (2013.01); *H04W 72/14* (2013.01)

(56) References Cited

U.S. PATENT DOCUMENTS

| | | |
|---|---|---|
| 2012/0275305 A1 | 11/2012 | Lin |
| 2013/0039284 A1* | 2/2013 | Marinier ................ H04L 5/001 370/329 |
| 2013/0114570 A1 | 5/2013 | Park et al. |
| 2013/0121304 A1* | 5/2013 | Nory ..................... H04L 1/1861 370/330 |
| 2013/0286957 A1 | 10/2013 | Bucknell et al. |
| 2013/0301561 A1* | 11/2013 | Sartori ................ H04W 72/04 370/329 |
| 2015/0181575 A1 | 6/2015 | Ng et al. |
| 2016/0183167 A1* | 6/2016 | Agiwal ................ H04W 48/16 370/329 |
| 2017/0265177 A1* | 9/2017 | Liu ..................... H04W 74/085 |
| 2019/0124655 A1* | 4/2019 | Liu ................... H04W 72/0446 |

FOREIGN PATENT DOCUMENTS

| | | |
|---|---|---|
| CN | 102549965 A | 7/2012 |
| CN | 102682116 A | 9/2012 |
| CN | 102761978 A | 10/2012 |
| CN | 103069763 A | 4/2013 |
| CN | 103120004 A | 5/2013 |
| EP | 2622923 A1 | 8/2013 |
| KR | 101391328 B1 | 5/2014 |
| WO | 2012041363 A1 | 4/2012 |

* cited by examiner

AIR INTERFACE RESOURCE DETERMINING METHOD AND APPARATUS AND AIR INTERFACE RESOURCE INDICATION METHOD AND APPARATUS

CROSS-REFERENCE TO RELATED APPLICATIONS

This application is a continuation of International Application No. PCT/CN2015/091377, filed on Sep. 30, 2015, the disclosure of which is hereby incorporated by reference in its entirety.

TECHNICAL FIELD

Embodiments of the present application relate to the communications field, and in particular, to an air interface resource determining method and apparatus and an air interface resource indication method and apparatus.

BACKGROUND

Machine type communication (MTC) that is also referred to as machine-to-machine (M2M) communication, or the Internet of Things (IoT) will be an important application in a future communications field. One type of important MTC system is a communications system based on an existing cellular network infrastructure. This type of MTC communications system is usually referred to as cellular MTC or a cellular IoT (CIoT).

In a CIoT system, a base station may perform downlink scheduling or uplink scheduling on a user equipment (UE). An example in which a base station performs uplink scheduling on UE is used. A process in which the base station performs uplink scheduling on the UE includes: The UE sends uplink data on a time-frequency resource indicated by the base station; after receiving the uplink data, the base station sends acknowledgement/negative acknowledgement (ACK/NACK) information to the UE according to a status of correctly or incorrectly receiving the data; and after the UE receives the ACK/NACK information, if the ACK/NACK information is an ACK, this data transmission is correctly completed; or if the ACK/NACK information is a NACK, it represents that the base station fails to correctly receive the data, and the UE needs to wait for the base station to schedule the UE again to resend the data.

In the process in which the base station performs uplink scheduling on the UE, the base station may schedule, by using a bitmap indication, the UE to receive the ACK/NACK information sent for the uplink data. The bitmap indication means that the base station respectively indicates ACK/NACK information of multiple UEs by using multiple pieces of bit information. Because each bit in a bitmap has no special meaning, the base station needs to specify a correspondence between each UE and each bit in the bitmap, that is, specify that a specific bit in the bitmap indicates a status of receiving uplink data of which UE.

In the prior art, a base station may specify a correspondence between each UE and each bit in a bitmap by using an implicit mapping method. Specifically, the implicit mapping method is to preset a rule for calculating a location relationship between the base station and the UE. The UE obtains, by means of calculation according to the calculation rule and known prior information, a bit corresponding to the UE in the bitmap.

However, for example, as shown in FIG. 1, a base station schedules, by using a scheduling block in a physical downlink control channel (PDCCH), UE to transmit uplink data. A scheduling block for UE a is a PDCCH1, and a scheduling block for UE b is a PDCCH2. The UE a has more uplink data, is scheduled to perform uplink transmission for a longer time, and needs to receive, in a bitmap x, ACK/NACK information sent by the base station for the UE a. The UE b has less uplink data, is scheduled to perform uplink transmission for a shorter time, and also needs to receive, in the bitmap x, ACK/NACK information sent by the base station for the UE b. Therefore, it can be learned that the UE a and the UE b may be mapped to a same bit in the bitmap x by using the implicit mapping method, thereby resulting in a problem that bits of different UEs are in collision.

SUMMARY

Embodiments of the present application provide an air interface resource determining method and apparatus and an air interface resource indication method and apparatus, so as to at least resolve a problem that a probability of collision between air interface resources for different UEs is relatively high.

According to a first aspect, an air interface resource determining method is provided, and includes:

obtaining a second index parameter j sent by a network side device by using a control channel;

generating a first index parameter i according to a preset mapping rule, where the first index parameter is used to indicate an index of at least one air interface resource in an air interface resource set configured by the network side device;

determining actual index information p according to the first index parameter and the second index parameter, where the actual index information is used to indicate an index of a target air interface resource in the air interface resource set; and obtaining the target air interface resource from the air interface resource set according to the actual index information, and using the target air interface resource as an air interface resource to be used by the user equipment.

With reference to the first aspect, in a first possible implementation, when the first index parameter is used to indicate an index of a first air interface resource in the air interface resource set, the second index parameter is used to indicate an offset of the index of the target air interface resource relative to the index of the first air interface resource; and the step of determining actual index information p according to the first index parameter and the second index parameter includes:

obtaining the actual index information by means of calculation according to a formula $p=(i\pm z\pm k\times j) \bmod N$, where N is a quantity of air interface resources in the air interface resource set, and k and z are constants.

With reference to the first aspect, in a second possible implementation, when the air interface resource set includes a first resource subset and a second resource subset, and the first index parameter is used to indicate an index of an air interface resource in the first resource subset, the second index parameter is used to indicate an index of an air interface resource in the second resource subset; and the step of determining actual index information p according to the first index parameter and the second index parameter includes:

if the second index parameter j is 0, determining that $p=i \bmod N$; or if the second index parameter j is not 0, determining that p=j mod N, where N is a quantity of air interface resources in the air interface resource set.

With reference to the first aspect, in a third possible implementation, when the air interface resource set includes an air interface resource group including a air interface resources, and the first index parameter is used to indicate indexes of the a air interface resources in the air interface resource set, where a is an integer greater than or equal to 2, the second index parameter is used to indicate an index of a first air interface resource in the a air interface resources that is in the air interface resource group; and the step of determining actual index information according to the first index parameter and the second index parameter includes:

determining an index of the first air interface resource in the air interface resource set according to the first index parameter and the second index parameter, and using the index as the actual index information.

With reference to the third possible implementation of the first aspect, in a fourth possible implementation, the first index parameter includes a first index sub parameters, and each first index sub parameter is used to indicate an index of one of the a air interface resources; and the step of determining an index of the first air interface resource in the air interface resource set according to the first index parameter and the second index parameter, and using the index as the actual index information includes:

determining, from the a first index sub parameters, a first index sub parameter r corresponding to the second index parameter, so as to determine p, where p=r mod N, and N is a quantity of air interface resources in the air interface resource set.

With reference to the third possible implementation of the first aspect, in a fifth possible implementation, the first index parameter is a group index of the air interface resource group; and the step of determining an index of the first air interface resource in the air interface resource set according to the first index parameter and the second index parameter, and using the index as the actual index information includes: obtaining the actual index information according to the group index of the air interface resource group and the second index parameter.

With reference to the first aspect, in a sixth possible implementation, when the air interface resource set includes a first resource subset and a second resource subset, and the first index parameter is used to indicate an index of an air interface resource in the first resource subset, the second index parameter is used to indicate an index of an air interface resource in the second resource subset; and the step of determining actual index information p according to the first index parameter and the second index parameter includes: determining first actual index information p1 according to the first index parameter, where p1=i mod N, and the first actual index information is used to indicate an index of a first target air interface resource in the air interface resource set; and determining second actual index information p2 according to the second index parameter, where p2=j mod N, the second actual index information is used to indicate an index of a second target air interface resource in the air interface resource set, and N is a quantity of air interface resources in the air interface resource set.

With reference to any one of the first aspect or the foregoing six possible implementations, in a seventh possible implementation, the step of generating a first index parameter i according to a preset mapping rule includes:

mapping, onto the first index parameter, a location sequence number of a scheduling block that is in a scheduling block set of the control channel and allocated to the user equipment in the control channel; or according to a preset hash function, substituting an identifier of the user equipment into the hash function, and mapping a calculation result onto the first index parameter.

With reference to any one of the first aspect or the foregoing seven possible implementations, in an eighth possible implementation, the radio communication air interface resource includes any one or a combination of multiple of:

a time resource; or
a frequency resource; or
an orthogonal sequence code resource.

With reference to the eighth possible implementation of the first aspect, in a ninth possible implementation, the time resource includes a bit location in a bitmap.

With reference to any one of the first aspect or the foregoing nine possible implementations, in a tenth possible implementation, the second index parameter is included in downlink control information DCI transmitted by using a physical downlink control channel PDCCH.

According to a second aspect, an air interface resource indication method is provided, and includes:

generating a first index parameter of a first user equipment and a third index parameter of a second user equipment according to a preset mapping rule, where the first index parameter is used to indicate an index of at least one air interface resource in an air interface resource set configured by the network side device for the first user equipment and the second user equipment, and the third index parameter is used to indicate an index of at least one air interface resource in the air interface resource set;

setting a second index parameter for the first user equipment and setting a fourth index parameter for the second user equipment if the first index parameter is the same as or partially the same as the third index parameter, so that actual index information determined according to the first index parameter and the second index parameter is different from actual index information determined according to the third index parameter and the fourth index parameter; and sending the second index parameter to the first user equipment, and sending the fourth index parameter to the second user equipment.

With reference to the second aspect, in a first possible implementation, when the first index parameter is used to indicate an index of a first air interface resource in the air interface resource set, and the third index parameter is used to indicate an index of a second air interface resource in the air interface resource set, the second index parameter is used to indicate an offset of an index of the target air interface resource of the first user equipment relative to the index of the first air interface resource, and the fourth index parameter is used to indicate an offset of an index of a target air interface resource of the second user equipment relative to the index of the second air interface resource; and the step of setting a second index parameter for the first user equipment and setting a fourth index parameter for the second user equipment if the first index parameter is the same as or partially the same as the third index parameter includes:

setting the second index parameter for the first user equipment and setting the fourth index parameter for the second user equipment if the first index parameter is the same as the third index parameter, where the fourth index parameter is different from the second index parameter.

With reference to the second aspect, in a second possible implementation, when the air interface resource set includes a first resource subset and a second resource subset, the first index parameter is used to indicate an index of an air interface resource in the first resource subset, and the third index parameter is used to indicate an index of an air interface resource in the first resource subset, the second index parameter is used to indicate an index of an air interface resource in the second resource subset, and the fourth index parameter is used to indicate an index of an air interface resource in the second resource subset; and the step of setting a second index parameter for the first user equipment and setting a fourth index parameter for the second user equipment if the first index parameter is the same as or partially the same as the third index parameter includes:

setting the second index parameter to 0 and setting the fourth index parameter to non-0 if the first index parameter is the same as the third index parameter.

With reference to the second aspect, in a third possible implementation, when the first index parameter is used to indicate indexes of a air interface resources in the air interface resource set, and the third index parameter is used to indicate indexes of b air interface resources in the air interface resource set, where a and b are integers greater than or equal to 2, the second index parameter is used to indicate an index of a first air interface resource in the a air interface resources that is in a first air interface resource group, and the fourth index parameter is used to indicate an index of a second air interface resource in the b air interface resources that is in a second air interface resource group, where the first air interface resource group includes the a air interface resources, and the second air interface resource group includes the b air interface resources; and the step of setting a second index parameter for the first user equipment and setting a fourth index parameter for the second user equipment if the first index parameter is the same as or partially the same as the third index parameter includes:

setting the second index parameter for the first user equipment and setting the fourth index parameter for the second user equipment if the first index parameter is the same as or partially the same as the third index parameter, so that an index that is of the first air interface resource in the air interface resource set and that is determined according to the first index parameter and the second index parameter is different from an index that is of the second air interface resource in the air interface resource set and that is determined according to the third index parameter and the fourth index parameter.

With reference to the second aspect, in a fourth possible implementation, when the air interface resource set includes a first resource subset and a second resource subset, the first index parameter is used to indicate an index of a first target air interface resource in the first resource subset, and the third index parameter is used to indicate an index of a third target air interface resource in the first resource subset, the second index parameter is used to indicate an index of a second target air interface resource in the second resource subset, and the fourth index parameter is used to indicate an index of a fourth target air interface resource in the second resource subset; and the step of setting a second index parameter for the first user equipment and setting a fourth index parameter for the second user equipment if the first index parameter is the same as or partially the same as the third index parameter includes:

set the second index parameter for the first user equipment and set the fourth index parameter for the second user equipment if the first index parameter is the same as the third index parameter, where the second index parameter is different from the fourth index parameter.

With reference to any one of the second aspect or the foregoing four possible implementations, in a fifth possible implementation, the radio communication air interface resource includes any one or a combination of multiple of:
a time resource; or
a frequency resource; or
an orthogonal sequence code resource.

With reference to the fifth possible implementation of the second aspect, in a sixth possible implementation, the time resource includes a bit location in a bitmap.

With reference to any one of the second aspect or the foregoing six possible implementations, in a seventh possible implementation, the sending the second index parameter to the first user equipment, and sending the fourth index parameter to the second user equipment includes:

sending first downlink control information DCI to the first user equipment by using a physical downlink control channel PDCCH, and sending second DCI to the second user equipment by using a PDCCH, where the first DCI includes the second index parameter, and the second DCI includes the fourth index parameter.

With reference to any one of the second aspect or the foregoing seven possible implementations, in an eighth possible implementation, the step of generating a first index parameter of a first user equipment and a third index parameter of a second user equipment according to a preset mapping rule includes:

mapping, onto the first index parameter, a location sequence number of a scheduling block that is in a scheduling block set and allocated by the network side device to the first user equipment; and mapping, onto the third index parameter, a location sequence number of a scheduling block that is in the scheduling block set and allocated by the network side device to the second user equipment; or according to a preset hash function, substituting an identifier of the first user equipment into the hash function, and mapping a calculation result onto the first index parameter; and substituting an identifier of the second user equipment into the hash function, and mapping a calculation result onto the third index parameter.

According to a third aspect, an air interface resource determining apparatus is provided, and includes:

a first obtaining module, configured to obtain a second index parameter j sent by a network side device by using a control channel;

a generation module, configured to generate a first index parameter i according to a preset mapping rule, where the first index parameter is used to indicate an index of at least one air interface resource in an air interface resource set configured by the network side device;

a determining module, configured to determine actual index information p according to the first index parameter and the second index parameter, where the actual index information is used to indicate an index of a target air interface resource in the air interface resource set; and a second obtaining module, configured to: obtain the target air interface resource from the air interface resource set according to the actual index information, and use the target air interface resource as an air interface resource to be used by the user equipment.

With reference to the third aspect, in a first possible implementation, when the first index parameter is used to indicate an index of a first air interface resource in the air interface resource set, the second index parameter is used to indicate an offset of the index of the target air interface resource relative to the index of the first air interface resource; and the determining module is configured to obtain the actual index information by means of calculation according to a formula $p=(i\pm z\pm k\times j) \bmod N$, where N is a quantity of air interface resources in the air interface resource set, and k and z are constants.

With reference to the third aspect, in a second possible implementation, when the air interface resource set includes a first resource subset and a second resource subset, and the first index parameter is used to indicate an index of an air interface resource in the first resource subset, the second index parameter is used to indicate an index of an air interface resource in the second resource subset; and the determining module is configured to: if the second index parameter j is 0, determine that $p=i \bmod N$; or if the second index parameter j is not 0, determine that $p=j \bmod N$, where N is a quantity of air interface resources in the air interface resource set.

With reference to the third aspect, in a third possible implementation, when the air interface resource set includes an air interface resource group including a air interface resources, and the first index parameter is used to indicate indexes of the a air interface resources in the air interface resource set, where a is an integer greater than or equal to 2, the second index parameter is used to indicate an index of a first air interface resource in the a air interface resources that is in the air interface resource group; and the determining module is configured to: determine an index of the first air interface resource in the air interface resource set according to the first index parameter and the second index parameter, and use the index as the actual index information.

With reference to the third possible implementation of the third aspect, in a fourth possible implementation, the first index parameter includes a first index sub parameters, and each first index sub parameter is used to indicate an index of one of the a air interface resources; and the determining module is configured to determine, from the a first index sub parameters, a first index sub parameter r corresponding to the second index parameter, so as to determine p, where $p=r \bmod N$, and N is a quantity of air interface resources in the air interface resource set.

With reference to the third possible implementation of the third aspect, in a fifth possible implementation, the first index parameter is a group index of the air interface resource group; and the determining module is configured to obtain the actual index information according to the group index of the air interface resource group and the second index parameter.

With reference to the third aspect, in a sixth possible implementation, when the air interface resource set includes a first resource subset and a second resource subset, and the first index parameter is used to indicate an index of an air interface resource in the first resource subset, the second index parameter is used to indicate an index of an air interface resource in the second resource subset; and the determining module is configured to: determine first actual index information p1 according to the first index parameter, where $p1=i \bmod N$, and the first actual index information is used to indicate an index of a first target air interface resource in the air interface resource set; and determine second actual index information p2 according to the second index parameter, where $p2=j \bmod N$, the second actual index information is used to indicate an index of a second target air interface resource in the air interface resource set, and N is a quantity of air interface resources in the air interface resource set.

With reference to any one of the third aspect or the foregoing six possible implementations, in a seventh possible implementation, the generation module is configured to:

map, onto the first index parameter, a location sequence number of a scheduling block that is in a scheduling block set of the control channel and allocated to the user equipment in the control channel; or according to a preset hash function, substitute an identifier of the user equipment into the hash function, and map a calculation result onto the first index parameter.

With reference to any one of the third aspect or the foregoing seven possible implementations, in an eighth possible implementation, the radio communication air interface resource includes any one or a combination of multiple of:

a time resource; or a frequency resource; or an orthogonal sequence code resource.

With reference to the eighth possible implementation of the third aspect, in a ninth possible implementation, the time resource includes a bit location in a bitmap.

With reference to any one of the third aspect or the foregoing nine possible implementations, in a tenth possible implementation, the second index parameter is included in downlink control information DCI transmitted by using a physical downlink control channel PDCCH.

According to a fourth aspect, an air interface resource indication apparatus is provided, and includes:

a generation module, configured to generate a first index parameter of a first user equipment and a third index parameter of a second user equipment according to a preset mapping rule, where the first index parameter is used to indicate an index of at least one air interface resource in an air interface resource set configured by the network side device for the first user equipment and the second user equipment, and the third index parameter is used to indicate an index of at least one air interface resource in the air interface resource set;

a setting module, configured to set a second index parameter for the first user equipment and set a fourth index parameter for the second user equipment if the first index parameter is the same as or partially the same as the third index parameter, so that actual index information determined according to the first index parameter and the second index parameter is different from actual index information determined according to the third index parameter and the fourth index parameter; and a sending module, configured to: send the second index parameter to the first user equipment, and send the fourth index parameter to the second user equipment.

With reference to the fourth aspect, in a first possible implementation, when the first index parameter is used to indicate an index of a first air interface resource in the air interface resource set, and the third index parameter is used to indicate an index of a second air interface resource in the air interface resource set, the second index parameter is used to indicate an offset of an index of the target air interface resource of the first user equipment relative to the index of the first air interface resource, and the fourth index parameter is used to indicate an offset of an index of a target air interface resource of the second user equipment relative to the index of the second air interface resource; and the setting module is configured to set the second index parameter for the first user equipment and set the fourth index parameter for the second user equipment if the first index parameter is the same as the third index parameter, where the fourth index parameter is different from the second index parameter.

With reference to the fourth aspect, in a second possible implementation, when the air interface resource set includes a first resource subset and a second resource subset, the first index parameter is used to indicate an index of an air interface resource in the first resource subset, and the third index parameter is used to indicate an index of an air interface resource in the first resource subset, the second index parameter is used to indicate an index of an air interface resource in the second resource subset, and the fourth index parameter is used to indicate an index of an air interface resource in the second resource subset; and the setting module is configured to set the second index parameter to 0 and set the fourth index parameter to non-0 if the first index parameter is the same as the third index parameter.

With reference to the fourth aspect, in a third possible implementation, when the first index parameter is used to indicate indexes of a air interface resources in the air interface resource set, and the third index parameter is used to indicate indexes of b air interface resources in the air interface resource set, where a and b are integers greater than or equal to 2, the second index parameter is used to indicate an index of a first air interface resource in the a air interface resources that is in a first air interface resource group, and the fourth index parameter is used to indicate an index of a second air interface resource in the b air interface resources that is in a second air interface resource group, where the first air interface resource group includes the a air interface resources, and the second air interface resource group includes the b air interface resources; and the setting module is configured to set the second index parameter for the first user equipment and set the fourth index parameter for the second user equipment if the first index parameter is the same as or partially the same as the third index parameter, so that an index that is of the first air interface resource in the air interface resource set and that is determined according to the first index parameter and the second index parameter is different from an index that is of the second air interface resource in the air interface resource set and that is determined according to the third index parameter and the fourth index parameter.

With reference to the fourth aspect, in a fourth possible implementation, when the air interface resource set includes a first resource subset and a second resource subset, the first index parameter is used to indicate an index of a first target air interface resource in the first resource subset, and the third index parameter is used to indicate an index of a third target air interface resource in the first resource subset, the second index parameter is used to indicate an index of a second target air interface resource in the second resource subset, and the fourth index parameter is used to indicate an index of a fourth target air interface resource in the second resource subset; and the setting module is configured to:
set the second index parameter for the first user equipment and set the fourth index parameter for the second user equipment if the first index parameter is the same as the third index parameter, where the second index parameter is different from the fourth index parameter.

With reference to any one of the fourth aspect or the foregoing four possible implementations, in a fifth possible implementation, the radio communication air interface resource includes any one or a combination of multiple of:
a time resource; or
a frequency resource; or
an orthogonal sequence code resource.

With reference to the fifth possible implementation of the fourth aspect, in a sixth possible implementation, the time resource includes a bit location in a bitmap.

With reference to any one of the fourth aspect or the foregoing six possible implementations, in a seventh possible implementation, the sending module is configured to: send first downlink control information DCI to the first user equipment by using a physical downlink control channel PDCCH, and send second DCI to the second user equipment by using a PDCCH, where the first DCI includes the second index parameter, and the second DCI includes the fourth index parameter.

With reference to any one of the fourth aspect or the foregoing seven possible implementations, in an eighth possible implementation, the generation module is configured to:
map, onto the first index parameter, a location sequence number of a scheduling block that is in a scheduling block set and allocated by the network side device to the first user equipment; and map, onto the third index parameter, a location sequence number of a scheduling block that is in the scheduling block set and allocated by the network side device to the second user equipment; or according to a preset hash function, substitute an identifier of the first user equipment into the hash function, and map a calculation result onto the first index parameter; and substitute an identifier of the second user equipment into the hash function, and map a calculation result onto the third index parameter.

According to a fifth aspect, user equipment is provided, and includes a processor, an interface circuit, and a bus, where the processor and the interface circuit are connected and complete mutual communication by using the bus;

the interface circuit is configured to obtain a second index parameter j sent by a network side device by using a control channel;

the processor is configured to generate a first index parameter i according to a preset mapping rule, where the first index parameter is used to indicate an index of at least one air interface resource in an air interface resource set configured by the network side device;

the processor is further configured to determine actual index information p according to the first index parameter and the second index parameter, where the actual index information is used to indicate an index of a target air interface resource in the air interface resource set; and the processor is further configured to: obtain the target air interface resource from the air interface resource set according to the actual index information, and use the target air interface resource as an air interface resource to be used by the user equipment.

With reference to the fifth aspect, in a first possible implementation, when the first index parameter is used to indicate an index of a first air interface resource in the air interface resource set, the second index parameter is used to indicate an offset of the index of the target air interface resource relative to the index of the first air interface resource; and the processor is configured to obtain the actual index information by means of calculation according to a formula $p=(i\pm z\pm k\times j)\bmod N$, where N is a quantity of air interface resources in the air interface resource set, and k and z are constants.

With reference to the fifth aspect, in a second possible implementation, when the air interface resource set includes a first resource subset and a second resource subset, and the first index parameter is used to indicate an index of an air interface resource in the first resource subset, the second index parameter is used to indicate an index of an air interface resource in the second resource subset; and the processor is configured to: if the second index parameter j is 0, determine that $p=i \bmod N$; or if the second index parameter j is not 0, determine that $p=j \bmod N$, where N is a quantity of air interface resources in the air interface resource set.

With reference to the fifth aspect, in a third possible implementation, when the air interface resource set includes an air interface resource group including a air interface resources, and the first index parameter is used to indicate indexes of the a air interface resources in the air interface resource set, where a is an integer greater than or equal to 2, the second index parameter is used to indicate an index of a first air interface resource in the a air interface resources that is in the air interface resource group; and the processor is configured to: determine an index of the first air interface resource in the air interface resource set according to the first index parameter and the second index parameter, and use the index as the actual index information.

With reference to the third possible implementation of the fifth aspect, in a fourth possible implementation, the first index parameter includes a first index sub parameters, and each first index sub parameter is used to indicate an index of one of the a air interface resources; and the processor is configured to determine, from the a first index sub parameters, a first index sub parameter r corresponding to the second index parameter, so as to determine p, where $p=r \bmod N$, and N is a quantity of air interface resources in the air interface resource set.

With reference to the third possible implementation of the fifth aspect, in a fifth possible implementation, the first index parameter is a group index of the air interface resource group; and the processor is configured to obtain the actual index information according to the group index of the air interface resource group and the second index parameter.

With reference to the fifth aspect, in a sixth possible implementation, when the air interface resource set includes a first resource subset and a second resource subset, and the first index parameter is used to indicate an index of an air interface resource in the first resource subset, the second index parameter is used to indicate an index of an air interface resource in the second resource subset; and the processor is configured to: determine first actual index information p1 according to the first index parameter, where $p1=i \bmod N$, and the first actual index information is used to indicate an index of a first target air interface resource in the air interface resource set; and determine second actual index information p2 according to the second index parameter, where $p2=j \bmod N$, the second actual index information is used to indicate an index of a second target air interface resource in the air interface resource set, and N is a quantity of air interface resources in the air interface resource set.

With reference to any one of the fifth aspect or the foregoing six possible implementations, in a seventh possible implementation, the processor is configured to:

map, onto the first index parameter, a location sequence number of a scheduling block that is in a scheduling block set of the control channel and allocated to the user equipment in the control channel; or according to a preset hash function, substitute an identifier of the user equipment into the hash function, and map a calculation result onto the first index parameter.

With reference to any one of the fifth aspect or the foregoing seven possible implementations, in an eighth possible implementation, the radio communication air interface resource includes any one or a combination of multiple of:

a time resource; or
a frequency resource; or
an orthogonal sequence code resource.

With reference to the eighth possible implementation of the fifth aspect, in a ninth possible implementation, the time resource includes a bit location in a bitmap.

With reference to any one of the fifth aspect or the foregoing nine possible implementations, in a tenth possible implementation, the second index parameter is included in downlink control information DCI transmitted by using a physical downlink control channel PDCCH.

According to a sixth aspect, a network side device is provided, and includes an interface circuit, a bus, and a processor, where the interface circuit and the processor are connected and complete mutual communication by using the bus;

the processor is configured to generate a first index parameter of a first user equipment and a third index parameter of a second user equipment according to a preset mapping rule, where the first index parameter is used to indicate an index of at least one air interface resource in an air interface resource set configured by the network side device for the first user equipment and the second user equipment, and the third index parameter is used to indicate an index of at least one air interface resource in the air interface resource set;

the processor is configured to set a second index parameter for the first user equipment and set a fourth index parameter for the second user equipment if the first index parameter is the same as or partially the same as the third index parameter, so that actual index information determined according to the first index parameter and the second index parameter is different from actual index information determined according to the third index parameter and the fourth index parameter; and the interface circuit is configured to: send the second index parameter to the first user equipment, and send the fourth index parameter to the second user equipment.

With reference to the sixth aspect, in a first possible implementation, when the first index parameter is used to indicate an index of a first air interface resource in the air interface resource set, and the third index parameter is used to indicate an index of a second air interface resource in the air interface resource set, the second index parameter is used to indicate an offset of an index of the target air interface resource of the first user equipment relative to the index of the first air interface resource, and the fourth index parameter is used to indicate an offset of an index of a target air interface resource of the second user equipment relative to the index of the second air interface resource; and the processor is configured to set the second index parameter for the first user equipment and set the fourth index parameter for the second user equipment if the first index parameter is the same as the third index parameter, where the fourth index parameter is different from the second index parameter.

With reference to the sixth aspect, in a second possible implementation, when the air interface resource set includes a first resource subset and a second resource subset, the first index parameter is used to indicate an index of an air interface resource in the first resource subset, and the third index parameter is used to indicate an index of an air interface resource in the first resource subset, the second index parameter is used to indicate an index of an air interface resource in the second resource subset, and the fourth index parameter is used to indicate an index of an air interface resource in the second resource subset; and the processor is configured to set the second index parameter to 0 and set the fourth index parameter to non-0 if the first index parameter is the same as the third index parameter.

With reference to the sixth aspect, in a third possible implementation, when the first index parameter is used to indicate indexes of a air interface resources in the air interface resource set, and the third index parameter is used to indicate indexes of b air interface resources in the air interface resource set, where a and b are integers greater than or equal to 2, the second index parameter is used to indicate an index of a first air interface resource in the a air interface resources that is in a first air interface resource group, and the fourth index parameter is used to indicate an index of a second air interface resource in the b air interface resources that is in a second air interface resource group, where the first air interface resource group includes the a air interface resources, and the second air interface resource group includes the b air interface resources; and the processor is configured to set the second index parameter for the first user equipment and set the fourth index parameter for the second user equipment if the first index parameter is the same as or partially the same as the third index parameter, so that an index that is of the first air interface resource in the air interface resource set and that is determined according to the first index parameter and the second index parameter is different from an index that is of the second air interface resource in the air interface resource set and that is determined according to the third index parameter and the fourth index parameter.

With reference to the sixth aspect, in a fourth possible implementation, when the air interface resource set includes a first resource subset and a second resource subset, the first index parameter is used to indicate an index of a first target air interface resource in the first resource subset, and the third index parameter is used to indicate an index of a third target air interface resource in the first resource subset, the second index parameter is used to indicate an index of a second target air interface resource in the second resource subset, and the fourth index parameter is used to indicate an index of a fourth target air interface resource in the second resource subset; and the processor is configured to set the second index parameter for the first user equipment and set the fourth index parameter for the second user equipment if the first index parameter is the same as the third index parameter, where the second index parameter is different from the fourth index parameter.

With reference to any one of the sixth aspect or the foregoing four possible implementations, in a fifth possible implementation, the radio communication air interface resource includes any one or a combination of multiple of:
a time resource; or
a frequency resource; or
an orthogonal sequence code resource.

With reference to the fifth possible implementation of the sixth aspect, in a sixth possible implementation, the time resource includes a bit location in a bitmap.

With reference to any one of the sixth aspect or the foregoing six possible implementations, in a seventh possible implementation, the interface circuit is configured to: send first downlink control information DCI to the first user equipment by using a physical downlink control channel PDCCH, and send second DCI to the second user equipment by using a PDCCH, where the first DCI includes the second index parameter, and the second DCI includes the fourth index parameter.

With reference to any one of the sixth aspect or the foregoing seven possible implementations, in an eighth possible implementation, the processor is configured to: map, onto the first index parameter, a location sequence number of a scheduling block that is in a scheduling block set and allocated by the network side device to the first user equipment; and map, onto the third index parameter, a location sequence number of a scheduling block that is in the scheduling block set and allocated by the network side device to the second user equipment; or according to a preset hash function, substitute an identifier of the first user equipment into the hash function, and map a calculation result onto the first index parameter; and substitute an identifier of the second user equipment into the hash function, and map a calculation result onto the third index parameter.

According to the air interface resource determining method and apparatus and the air interface resource indication method and apparatus that are provided in the embodiments of the present application, the actual index information of the user equipment is determined by using the two index parameters (including the first index parameter and the second index parameter). In this way, only when two index parameters of a user equipment are all the same as two index parameters of another user equipment, actual index information of the different user equipments is the same, and consequently, air interface resources for the different user equipments that are determined according to the actual index information are in collision. When two index parameters of a user equipment are not all the same as two index parameters of another user equipment, actual index information is prevented from being the same, or a probability that actual index information is the same is extremely low. Compared with a prior-art solution in which an air interface resource is determined by using only one index parameter, in the solutions provided in the embodiments of the present application, a probability that two index parameters of a user equipment are all the same as two index parameters of another user equipment is lower, so that a probability that actual index information of the different user equipments is the same is lower. Therefore, a probability of collision between air interface resources obtained according to the actual index information can be reduced.

DESCRIPTION OF EMBODIMENTS

To make the objectives, technical solutions, and advantages of the embodiments of the present application clearer, the following clearly describes the technical solutions in the embodiments of the present application with reference to the accompanying drawings in the embodiments of the present application. Apparently, the described embodiments are some but not all of the embodiments of the present application. All other embodiments obtained by a person of ordinary skill in the art based on the embodiments of the present application without creative efforts shall fall within the protection scope of the present application.

The solutions provided in the embodiments of the present application are applicable to multiple mobile communications systems. For example, the mobile communications system may be an MTC system, especially a CIoT system, or may be a Code Division Multiple Access (CDMA) system, Wideband Code Division Multiple Access (WCDMA) system, a Time Division-Synchronous Code Division Multiple Access (TD-SCDMA) system, and another communications system of this type.

In the CIoT system, for either a user equipment or a base station, in the prior art, a piece of index information is first obtained by using a preset mapping rule, a bit location corresponding to the user equipment is determined according to the index information, and ACK/NACK information sent by the base station for the user equipment is received at the bit location. However, once different user equipments are mapped to same index information by using the mapping rule, bit locations corresponding to the different user equipments are in collision. Similarly, there may be such a problem in another mobile communications system. That is, once different user equipments are mapped to same index information by using the mapping rule, radio air interface resources corresponding to the different user equipments are in collision.

Figure 1:
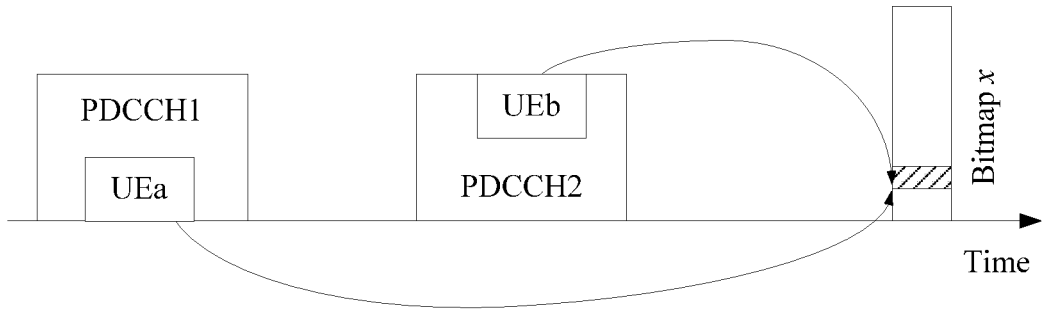
FIG. 1 is a schematic diagram in which bit locations of different UEs are in collision in the prior art.
Figure 2:
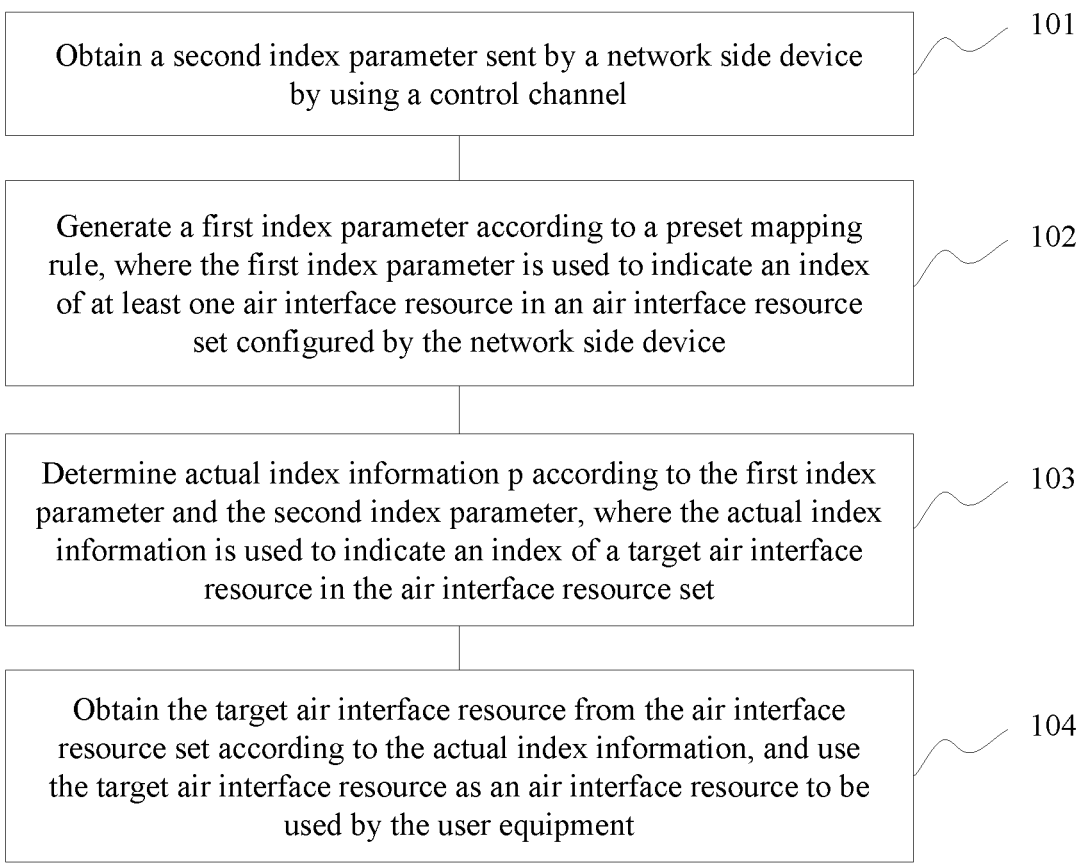
FIG. 2 is a first flowchart of an air interface resource determining method according to an embodiment of the present application.

To resolve this problem, FIG. 2 shows a flowchart of an air interface resource determining method according to an embodiment of the present application. The following steps are performed by a user equipment. Specifically, the following operations may be implemented by using hardware, software, or a combination of hardware and software. The method in this embodiment includes the following steps:

Step 101: Obtain a second index parameter sent by a network side device by using a control channel. The second index parameter is represented as j in this embodiment of the present application.

Step 102: Generate a first index parameter according to a preset mapping rule, where the first index parameter is used to indicate an index of at least one air interface resource in an air interface resource set configured by the network side device. The first index parameter is represented as i in this embodiment of the present application.

Step 103: Determine actual index information p according to the first index parameter and the second index parameter, where the actual index information is used to indicate an index of a target air interface resource in the air interface resource set.

Step 104: Obtain the target air interface resource from the air interface resource set according to the actual index information, and use the target air interface resource as an air interface resource to be used by the user equipment.

The user equipment mentioned in all embodiments of the present application is a wireless terminal. The wireless terminal may be a device that provides a user with voice and/or data connectivity, a handheld device with a radio connection function, or another processing device connected to a wireless modem. The wireless terminal may communicate with one or more core networks through a radio access network (RAN). The wireless terminal may be a mobile terminal, such as a mobile phone (or referred to as a "cellular" phone) and a computer with a mobile terminal, for example, may be a portable, pocket-sized, handheld, computer built-in, or in-vehicle mobile apparatus, which exchanges voice and/or data with the radio access network. For example, the wireless terminal may be a device such as a personal communication service (PCS) phone, a cordless telephone set, a Session Initiation Protocol (SIP) phone, a wireless local loop (WLL) station, or a personal digital assistant (PDA). The wireless terminal may also be referred to as a system, a subscriber unit, a subscriber station, a mobile station, a mobile, a remote station, an access point, a remote terminal, an access terminal, a user terminal, a user agent, a user device, or the like.

The network side device may be a device that communicates with a wireless terminal via one or more sectors at an air interface in an access network, for example, may be a base station. The network side device may be configured to mutually convert a received over-the-air frame and an IP packet and serve as a router between the wireless terminal and a rest portion of the access network. The rest portion of the access network may include an Internet Protocol (IP) network. The network side device may further coordinate attribute management of the air interface. The network side device may be, for example, a base station. The base station may be a base transceiver station (BTS) in CDMA, or may be a NodeB in WCDMA or TD-SCDMA. This is not limited in this application.

In step 101 and step 102, a person skilled in the art should understand that, the user equipment (which is denoted as UE1 to be distinguished from another user equipment) in this embodiment of the present application obtains only the first index parameter and the second index parameter that are required when the user equipment determines the air interface resource for the user equipment, and does not need to obtain an index parameter of another UE. Each of the index parameters (including the first index parameter and the second index parameter) is used to indicate an index of at least one air interface resource in the air interface resource set. The air interface resource set includes air interface resources configured by the network side device for multiple UEs that communicate with the network side device. The air interface resource is generally a radio communication air interface resource. The air interface resource set is a radio communication air interface resource set.

The present application mainly resolves a problem caused when an implicit mapping manner is used. Therefore, in this step, the first index parameter may be obtained still in the implicit mapping manner, that is, the first index parameter is generated according to the preset mapping rule. The mapping rule is used to calculate the first index parameter. A mapping rule used by each UE that communicates with the network side device should be the same as a mapping rule used by the network side device.

The mapping rule is preset in the user equipment by a manufacturer for the user equipment or a network communications service provider. Alternatively, the mapping rule is obtained by the user equipment according to system information broadcast in a wireless network. The system information is sent by the network side device.

Generally, space occupied by the second index parameter is not long. Therefore, in this embodiment, preferably, the UE1 obtains the second index parameter from the network side device. That is, the network side device sets a second index parameter for each UE that communicates with the network side device, and sends the second index parameter to each UE by using a control channel. Specifically, the network side device may send, to each UE by using the control channel, control information that carries the second index parameter, so that the UE1 obtains the second index parameter of the UE1 from the control information sent by the network side device. The control channel may be any channel used by the network side device to send information (which may be data, signaling, or the like) to the UE, for example, may be a PDCCH. This is not limited in this embodiment of the present application.

Specifically, a manner in which the UE1 generates the first index parameter may be:

mapping, onto the first index parameter, a location sequence number of a scheduling block that is in a scheduling block set of the control channel and allocated to the user equipment in the control channel; or according to a preset hash function, substituting an identifier of the user equipment into the hash function, and mapping a calculation result onto the first index parameter. Further, optionally, the manner is: according to the preset hash function, substituting the identifier UE_ID of the user equipment into the hash function, and mapping the calculation result onto the first index parameter, where $i=f$ (UE_ID)mod N, $f(\cdot)$ is the hash function, and N is a quantity of air interface resources in the air interface resource set.

In step 103, from a perspective of an entire mobile communications system, if a network side device performs radio communication with multiple UEs, to prevent radio communication air interface resources corresponding to two UEs from being in collision, when the index indicated by the first index parameter of the UE1 is the same as or partially the same as that indicated by a third index parameter of any other UE (that is, any UE, other than the UE1, that communicates with the network side device and is represented as UE2), the second index parameter of the UE1 and a fourth index parameter of the UE2 may be set, so that the actual index information determined according to the first index parameter and the second index parameter of the UE1 is different from actual index information determined according to the third index parameter and the fourth index parameter of the UE2.

That the index indicated by the first index parameter of the UE1 is the same as or partially the same as that indicated by the third index parameter of the UE2 is as follows: When the first index parameter of the UE1 and the third index parameter of the UE2 each include only one parameter, if the first index parameter of the UE1 is the same as the third index parameter of the UE2, the first index parameter of the UE1 and the third index parameter of the UE2 are corresponding to a same index. When the first index parameter of the UE1 and the third index parameter of the UE2 each include multiple (at least two) index sub parameters, and quantities of included sub parameters are the same, if the multiple index sub parameters included in the first index parameter of the UE1 are all or partially the same as the multiple index sub parameters included in the third index parameter of the UE2, at least one of multiple indexes of the UE1 that are indicated by the first index parameter is the same as at least one of multiple indexes of the UE2 that are indicated by the third index parameter (that is, all or partially the same).

In addition, in this step, the index of the target air interface resource in the air interface resource set is index information that can be used to obtain, from the radio communication air interface resource set, the radio communication air interface resource to be used by the user equipment.

Usually, the radio communication air interface resource set is configured by the network side device. The set has a specific length, and the length of the set is represented as N, which indicates that the set has N radio communication air interface resources. The length is usually a configured fixed value, but may also be changed. A changed length value needs to be notified to the UE that communicates with the network side device. A notification manner is not limited in the present application, for example, system broadcasting may be used.

Certainly, not all the N radio communication air interface resources in the radio communication air interface resource set are necessarily used in each scheduling. For example, the length N of the radio communication air interface resource set is 1000. If currently, 50 UEs communicate with the network side device, 50 radio communication air interface resources in the radio communication air interface resource set may be used. Each UE needs to determine actual index information used to obtain a radio communication air interface resource for the UE. The actual index information is used to obtain the radio communication air interface resource for the UE from the N radio communication air interface resources. The 950 remaining radio communication air interface resources are not used.

The radio communication air interface resource in this embodiment of the present application may include any one or a combination of multiple of: a time resource, a frequency resource, or an orthogonal sequence code resource. The time resource may include a bit location in a bitmap. The bit location is a location corresponding to each user equipment in the bitmap when the network side device sends information to multiple user equipments by using the bitmap. Particularly, the radio communication air interface resource may be a combination of the multiple resources. For example, the radio communication air interface resource may be a combination of the time resource and the frequency resource, and may be referred to as a time-frequency resource.

In step 104, the target air interface resource for the UE1 may be obtained by using the actual index information obtained in this step, so that the UE1 communicates with the network side device by using the target air interface resource. For example, the UE1 may send or receive information by using the target air interface resource.

According to the air interface resource determining method provided in this embodiment of the present application, the actual index information of the user equipment is determined by using the two index parameters (for example, including the first index parameter and the second index parameter). In this way, only when two index parameters of user equipment are all the same as two index parameters of another user equipment, actual index information of the different user equipments is the same, and consequently, air interface resources for the different user equipments that are determined according to the actual index information are in collision. When two index parameters of a user equipment are not all the same as two index parameters of another user equipment, actual index information is prevented from being the same, or a probability that actual index information is the same is extremely low. Compared with a prior-art solution in which an air interface resource is determined by using only one index parameter, in a solution provided in this embodiment of the present application, a probability that two index parameters of a user equipment are all the same as two index parameters of another user equipment is lower, so that a probability that actual index information of the different user equipments is the same is lower. Therefore, a probability of collision between air interface resources obtained according to the actual index information can be reduced.

That two index parameters of a user equipment are not all the same as two index parameters of another user equipment means that the first index parameter of the UE1 is different from the third index parameter of the UE2, and/or the second index parameter of the UE1 is different from the fourth index parameter of the UE2.

Figure 3:
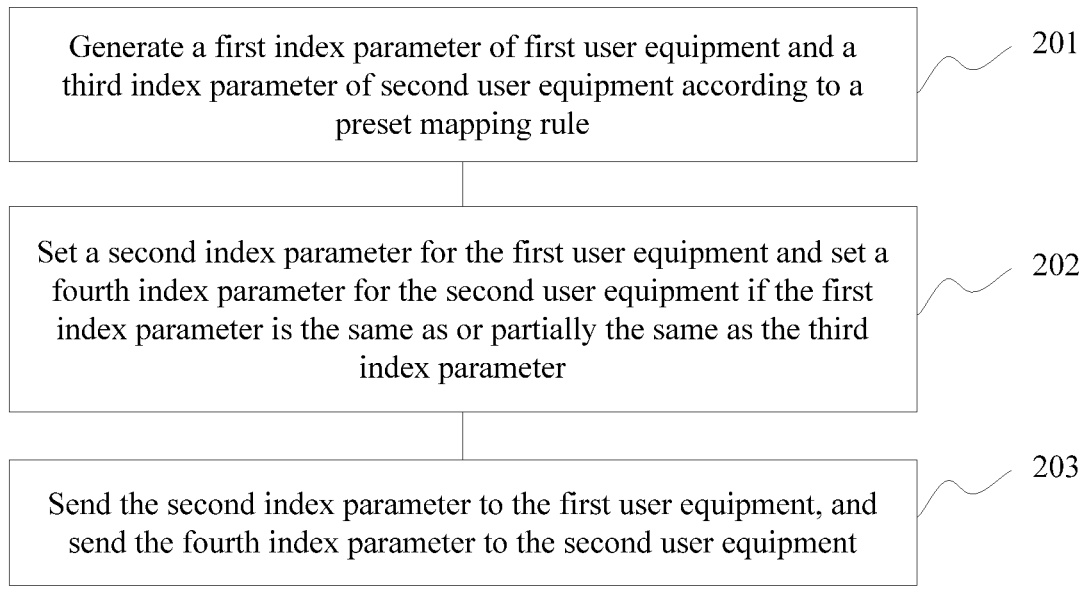
FIG. 3 is a first flowchart of an air interface resource indication method according to an embodiment of the present application.

FIG. 3 is a flowchart of an air interface resource indication method according to another embodiment of the present application. The following steps are performed by a network side device. Specifically, the following operations may be implemented by using hardware, software, or a combination of hardware and software. The method in this embodiment includes the following steps:

Step 201: Generate a first index parameter of a first user equipment and a third index parameter of a second user equipment according to a preset mapping rule, where the first index parameter is used to indicate an index of at least one air interface resource in an air interface resource set configured by the network side device for the first user equipment and the second user equipment, and the third index parameter is used to indicate an index of at least one air interface resource in the air interface resource set.

Step 202: Set a second index parameter for the first user equipment and set a fourth index parameter for the second user equipment if the first index parameter is the same as or partially the same as the third index parameter, so that actual index information determined according to the first index parameter and the second index parameter is different from actual index information determined according to the third index parameter and the fourth index parameter.

Step 203: Send the second index parameter to the first user equipment, and send the fourth index parameter to the second user equipment.

In step 201, the first user equipment (which is represented as UE1) and the second user equipment (which is represented as UE2) are any two user equipments that communicate with the network side device.

Likewise, because a problem caused when an implicit mapping manner is used needs to be resolved, in this step, the first index parameter and the third index parameter may be obtained still in the implicit mapping manner, that is, the network side device may generate the first index parameter and the third index parameter according to the preset mapping rule. The mapping rule is used to map a known parameter onto the first index parameter or the third index parameter. A mapping rule used by the network side device should be the same as a mapping rule used by each UE. Therefore, the known parameter should be stored or can be obtained by both the network device and each UE. Specifically, the mapping rule is used to: map a known parameter of the UE1 onto the first index parameter, and map a known parameter of the UE2 onto the third index parameter.

In addition, if the first index parameter of the UE1 that is generated by the network side device includes one parameter, the first index parameter of the UE1 may be obtained according to a mapping rule in the prior art. If the first index parameter of the UE1 that is generated by the network side device includes at least two first index sub parameters, the first index parameter of the UE1 needs to be calculated by using a new mapping rule. The new mapping rule is not limited herein provided that multiple index sub parameters can be obtained by using a mapping rule. A mapping rule used by the network side device to generate the third index parameter of the UE2 is the same as the mapping rule used to generate the first index parameter of the UE1. Details are not described herein again.

This step optionally includes: mapping, onto the first index parameter, a location sequence number of a scheduling block that is in a scheduling block set and allocated by the network side device to the first user equipment, and mapping, onto the third index parameter, a location sequence number of a scheduling block that is in the scheduling block set and allocated by the network side device to the second user equipment; or according to a preset hash function, substituting an identifier of the first user equipment into the hash function, and mapping a calculation result onto the first index parameter; and substituting an identifier of the second user equipment into the hash function, and mapping a calculation result onto the third index parameter. Further, optionally, this step is: according to the preset hash function, substituting the identifier UE1_ID of the first user equipment into the hash function, and mapping the calculation result onto the first index parameter $i_{UE1}$; and substituting the identifier UE2_ID of the second user equipment into the hash function, and mapping the calculation result onto the third index parameter $i_{UE2}$, where $i_{UE1}=f(UE1\_ID) \bmod N$, $i_{UE2}=f(UE2\_ID) \bmod N$, $f(\bullet)$ is the hash function, and N is a quantity of air interface resources in the air interface resource set.

In step 202, that in a same radio communication air interface resource set, an index indicated by the first index parameter of the UE1 is the same as or partially the same as that indicated by the third index parameter of the UE2 is described in the foregoing embodiment. Details are not described herein again.

When the index indicated by the first index parameter of the UE1 is the same as or partially the same as that indicated by the third index parameter of the UE2, it means that a radio communication air interface resource for the UE1 and that for the UE2 may be in collision. In this case, the network side device may set the second index parameter of the UE1 and the fourth index parameter of the UE2, so that the actual index information determined by the UE1 according to the first index parameter and the second index parameter is different from the actual index information determined by the UE2 according to the third index parameter and the fourth index parameter, so that the radio communication air interface resource for the UE1 can be different from the radio communication air interface resource for the UE2.

Specifically, if the first index parameter of the UE1 and the third index parameter of the UE2 each include one parameter and are the same, the index indicated by the first index parameter of the UE1 is the same as the index indicated by the third index parameter of the UE2. Consequently, a location collision inevitably occurs between the radio communication air interface resources obtained according to the index of the UE1 and the index of the UE2. In this case, the UE1 and the UE2 may be mapped to different radio communication air interface resources provided that the second index parameter set for the UE1 is different from the fourth index parameter set for the UE2, so as to resolve a problem that the radio communication air interface resources are in collision.

If the first index parameter of the UE1 and the third index parameter of the UE2 each include at least two index sub parameters, and are all the same or partially the same, air interface resource indexes respectively indicated by the first index sub parameters included in the first index parameter of the UE1 are all the same as or partially the same as air interface resource indexes respectively indicated by the index sub parameters included in the third index parameter of the UE2. Consequently, a location collision may occur between a radio communication air interface resource corresponding to the UE1 and that corresponding to the UE2. In this case, it needs to be ensured that the actual index information determined by the UE1 according to the first index parameter and the second index parameter is different from the actual index information determined by the UE2 according to the third index parameter and the fourth index parameter, so that the UE1 and the UE2 can be corresponding to different radio communication air interface resources. The second index parameter of the UE1 and the fourth index parameter of the UE2 may be the same or may be different.

The radio communication air interface resource in this embodiment of the present application may include any one or a combination of multiple of: a time resource, a frequency resource, or an orthogonal sequence code resource. The time resource may include a bit location in a bitmap. The bit location is a location corresponding to each user equipment in the bitmap when the network side device sends information to multiple user equipments by using the bitmap. Particularly, the radio communication air interface resource may be a combination of the multiple resources. For example, the radio communication air interface resource may be a combination of the time resource and the frequency resource, and may be referred to as a time-frequency resource.

In step 203, usually, space occupied by the second index parameter and space occupied by the fourth index parameter are relatively small. Therefore, in this embodiment, preferably, the network side device sends the second index parameter of the UE1 to the UE1 by using a control channel, and sends the fourth index parameter of the UE2 to the UE2 by using a control channel. Further, the network side device may write the second index parameter of the UE1 into control information for the UE1, and send the control information to the UE1 by using the control channel. Likewise, the network side device may write the fourth index parameter of the UE2 into control information for the UE2, and send the control information to the UE2 by using the control channel.

According to the air interface resource indication method provided in this embodiment of the present application, the actual index information of the user equipment is determined by using the two index parameters (including the first index parameter and the second index parameter). In this way, only when two index parameters of a user equipment are all the same as two index parameters of another user equipment, actual index information of the different user equipments is the same, and consequently, air interface resources for the different user equipments that are determined according to the actual index information are in collision. When two index parameters of user equipment are not all the same as two index parameters of another user equipment, actual index information is prevented from being the same, or a probability that actual index information is the same is extremely low. Compared with a prior-art solution in which an air interface resource is determined by using only one index parameter, in a solution provided in this embodiment of the present application, a probability that two index parameters of a user equipment are all the same as two index parameters of another user equipment is lower, so that a probability that actual index information of the different user equipments is the same is lower. Therefore, a probability of collision between air interface resources obtained according to the actual index information can be reduced.

Another embodiment of the present application provides an air interface resource determining method to describe the foregoing solution in detail. This embodiment is applied to an uplink scheduling process in a CIoT system. A network side device is an eNodeB eNB. A radio communication air interface resource set is an ACK/NACK bitmap (a bitmap used to bear ACK/NACK information) that has N bit locations. Each bit location is used as one radio communication air interface resource. One bit location is used to bear ACK/NACK information sent to one UE. The ACK/NACK information sent to the UE is used to indicate whether uplink data sent by the UE is correctly received by the eNodeB. For such a scenario, an index is information used to find a bit location.

Figure 4:
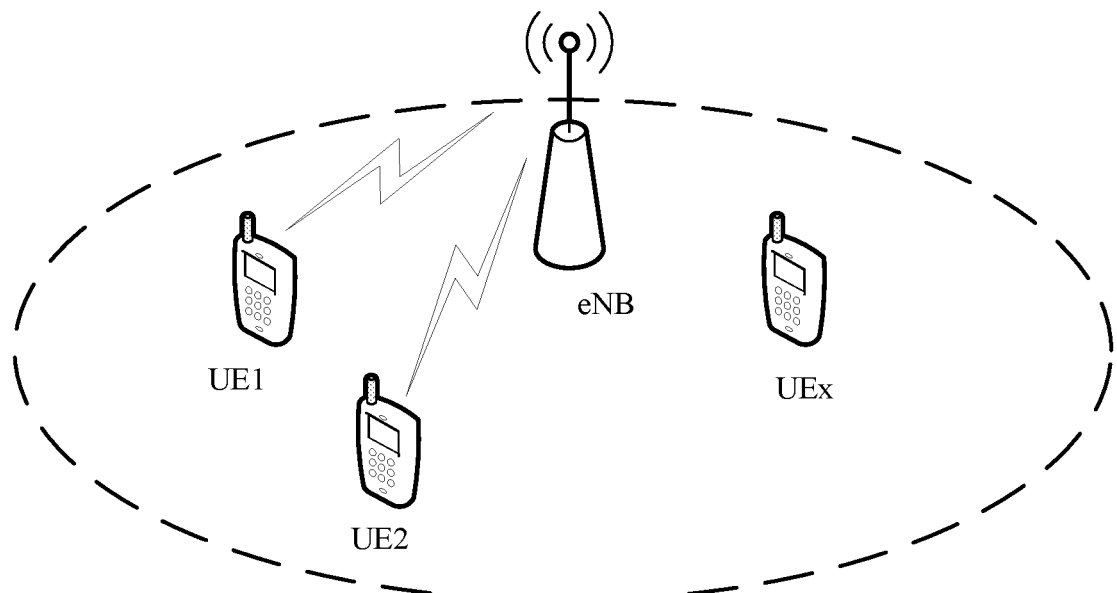
FIG. 4 is a diagram of a CIoT system architecture according to an embodiment of the present application.

FIG. 4 is a diagram of a CIoT system architecture. A CIoT system includes an eNB and multiple UEs in a control range of the eNB. The eNB may simultaneously schedule a maximum of N UEs. Currently, n (N≥n≥2) UEs communicate with the eNB (that is, the eNB schedules data transmission of the n UEs). For example, both UE1 and UE2 communicate with the eNB. Some other UEs, such as UEx, currently do not communicate with the eNB.

Figure 5:
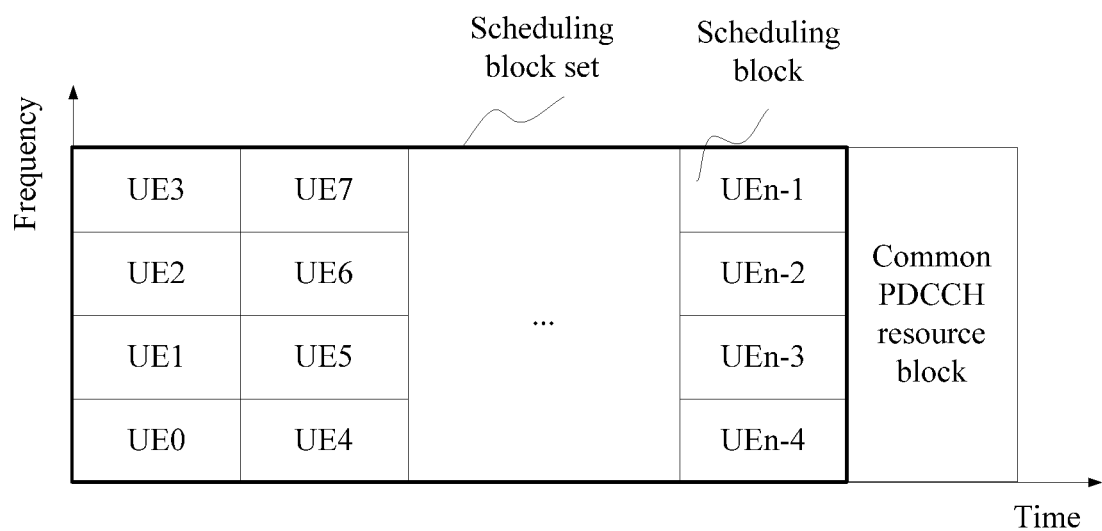
FIG. 5 is a distribution diagram of time-frequency resources on which an eNB schedules n UEs on PDCCHs according to an embodiment of the present application.

FIG. 5 is a distribution diagram of time-frequency resources on which an eNB schedules n UEs on PDCCHs. In a CIoT system, the eNB may perform uplink scheduling on the UE by using the PDCCH, that is, allocate a block of time and frequency resource (that is, a time-frequency resource) to the UE, and instruct the UE to send uplink data by using the time-frequency resource. In addition, the eNB may send some pieces of control information or feedback information (such as ACK/NACK information) on the PDCCH. The PDCCH is also a time-frequency resource block. Because the time-frequency resource block is used to schedule uplink/downlink data transmission of multiple UEs, the time-frequency resource block is referred to as a scheduling block set. The scheduling block set may be divided into multiple small time-frequency resource blocks in terms of time and frequency. Each small block is used as a scheduling block allocated to one UE. A number of each UE is indicated on a scheduling block allocated to the UE in FIG. 5. In addition, before or after the scheduling blocks for the n UEs, a common PDCCH resource block may be allocated. The common PDCCH resource block may bear feedback information of the eNB for the UE.

Figure 6:
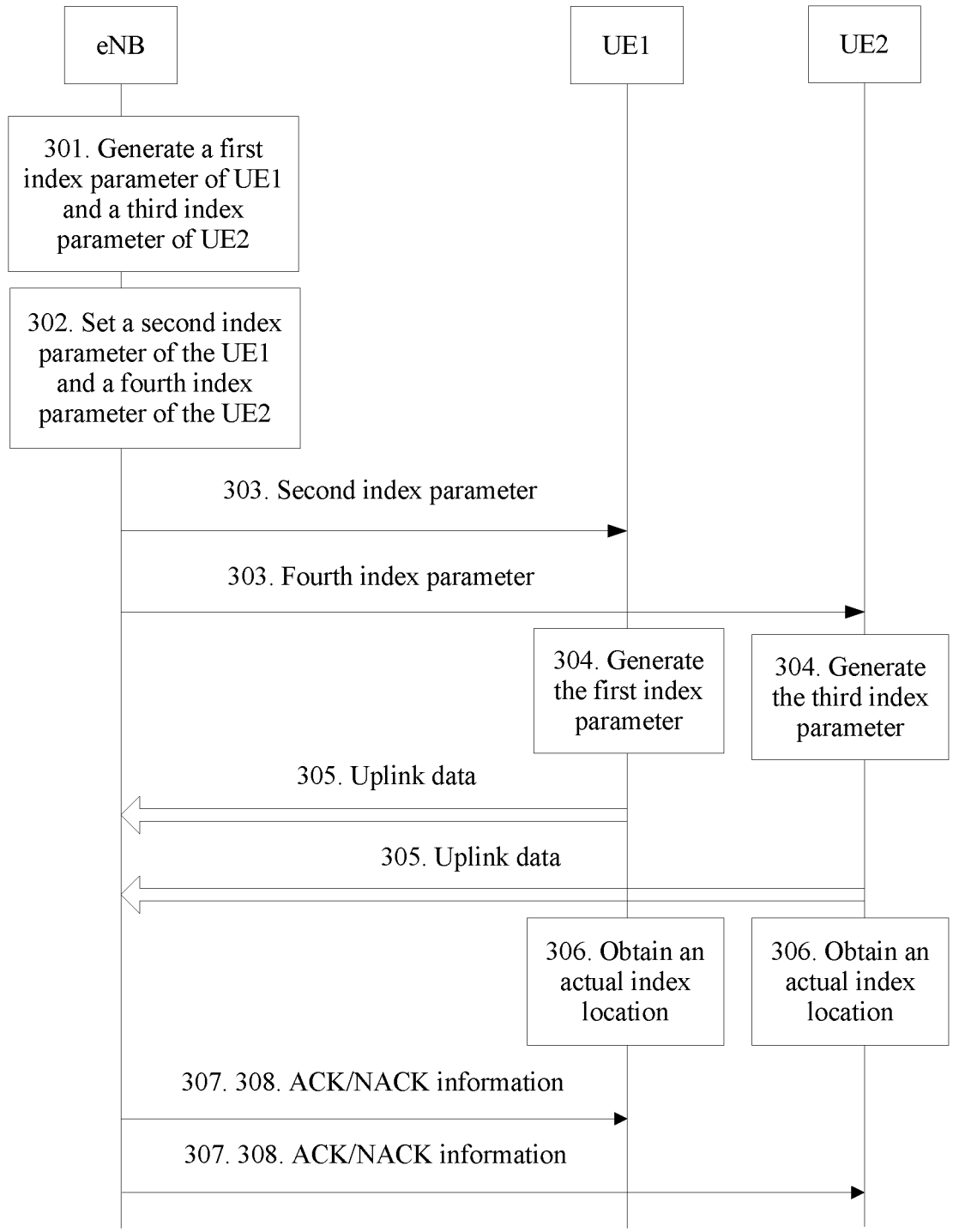
FIG. 6 is a second flowchart of an information transmission method according to an embodiment of the present application.

FIG. 6 is a flowchart of an information transmission method according to a first specific embodiment of the present application. The information transmission method is an uplink scheduling process. The information transmission method may include the following steps.

Step 301: An eNB generates a first index parameter of UE1 and a third index parameter of UE2.

In this step, the generated first index parameter of the UE1 is one parameter and is used to indicate an index of a first bit location in an ACK/NACK bitmap, and the generated third index parameter of the UE2 is also one parameter and is used to indicate an index of a second bit location in the ACK/NACK bitmap.

A manner in which the eNB generates the first index parameter of the UE1 may be as follows: The eNB maps, onto the first index parameter of the UE1, a location sequence number of a scheduling block that is in a scheduling block set and allocated by the eNB to the UE1. The scheduling block may bear the first index parameter, or certainly may not bear the first index parameter. Specifically, referring to FIG. 5, the eNB may allocate the scheduling block set to n UEs, and use, onto the first index parameter of the UE1, a difference between a start location of the scheduling block set and a location of the scheduling block allocated to the UE1. Specifically, differences between the start location of the scheduling block set and the location of the scheduling block allocated to the UE1 are calculated in two dimensions of time and frequency, and then the first index parameter of the UE1 is obtained according to difference values calculated in the two dimensions. For example, a location of a scheduling block allocated to UE0 is the start location of the scheduling block set, and is denoted as 0. In this case, the difference between the start location of the scheduling block set and the location of the scheduling block allocated to the UE1 is 0 in the dimension of time, the difference between the start location of the scheduling block set and the location of the scheduling block allocated to the UE1 is 1 in the dimension of frequency, and the first index parameter of the UE1 that is obtained by means of calculation is 1 (where 1=4*0+1).

Similarly, a manner in which the eNB generates the third index parameter of the UE2 may be as follows: A location sequence number of a scheduling block that is in a scheduling block set and allocated by the eNB to the UE2 is mapped onto the third index parameter. For a specific manner, refer to the manner in which the eNB generates the first index parameter of the UE1. It should be noted that the scheduling block set in which the scheduling block allocated by the eNB to the UE1 is located may be the same as or may be different from the scheduling block set in which the scheduling block allocated by the eNB to the UE2 is located.

Alternatively, a manner in which the eNB generates the first index parameter of the UE1 may be as follows: According to a preset hash function, an identifier of the UE1 is substituted into the hash function, and a calculation result is mapped onto the first index parameter. Alternatively, a manner in which the eNB generates the third index parameter of the UE2 may be as follows: According to a preset hash function, an identifier of the UE2 is substituted into the hash function, and a calculation result is mapped onto the third index parameter.

The hash function $f(\bullet)$ (which is represented as $f_1(\bullet)$ in this embodiment to be distinguished from a hash function in another embodiment) is agreed on by the eNB and the UE in advance, the first index parameter is represented as i, and the identifier of the UE is represented as UE_ID. In this case, $i=f_1(UE\_ID)$. The identifier of the UE may be one or a combination of multiple of an international mobile subscriber identity (IMSI), a cell radio network temporary identifier (C-RNTI), a system architecture evolution-temporary mobile subscriber identity (S-TMSI), or the like. This is not limited herein. It should be noted that an input parameter of the hash function may further include another parameter such as a current radio frame number. For specific details, refer to the prior art. This is not limited herein. Moreover, in addition to the identifier of the UE, an input parameter of $f_1(\bullet)$ may include another parameter. This is not limited herein.

When generating the first index parameter $i_{UE1}$ of the UE1, the eNB needs to substitute the identifier (which is represented as UE1_ID) of the UE1 into the hash function. When generating the third index parameter $i_{UE2}$ of the UE2, the eNB needs to substitute the identifier (which is represented as UE2_ID) of the UE2 into the hash function. That is, $i_{UE1}=f(UE1\_ID) \bmod N$, and $i_{UE2}=f(UE2\_ID) \bmod N$ (it should be noted that usually a modulo operation needs to be performed, or certainly a modulo operation may not be performed according to a requirement).

Step 302: If the first index parameter is the same as the third index parameter, the eNB sets a second index parameter for the UE1, and sets a fourth index parameter for the UE2.

If the first index parameter is the same as the third index parameter, it means that the index of the first bit location is the same as the index of the second bit location in step 301, that is, the first bit location and the second bit location are a same bit location.

In this case, the eNB sets the second index parameter for the UE1, and sets the fourth index parameter for the UE2, provided that the fourth index parameter is different from the second index parameter. The second index parameter is used to indicate an offset relative to the index of the first bit location. The fourth index parameter is used to indicate an offset of an index of a target air interface resource relative to the index of the second bit location. Because the index of the first bit location indicates a same bit location as the index of the second bit location, provided that the offset of the UE1 is different from that of the UE2, actual index information determined according to the first index parameter and the second index parameter may be different from actual index information determined according to the third index parameter and the fourth index parameter, so as to prevent a target bit location of the UE1 and a target bit location of the UE2 from being in collision.

For example, the second index parameter of the UE1 may be set to 0, so that the target bit location of the UE1 is the first bit location. The fourth index parameter of the UE2 is set to non-0, so that the target bit location of the UE2 is not the second bit location.

Step 303: The eNB sends the second index parameter to the UE1, and the eNB sends the fourth index parameter to the UE2. Correspondingly, the UE1 receives the second index parameter, and the UE2 receives the fourth index parameter.

Optionally, the eNB sends first DCI to the UE1 by using a PDCCH. The first DCI carries the second index parameter. Certainly, the first DCI may further include information for the UE1, such as a size of an uplink data transmission block or a modulation and coding scheme for data transmission. Likewise, the eNB sends second DCI to the UE2 by using a PDCCH. The second DCI carries the fourth index parameter. Certainly, the second DCI may further include information for the UE2, such as a size of an uplink data transmission block or a modulation and coding scheme for data transmission.

The first DCI may be borne in the scheduling block allocated by the eNB to the UE1. The second DCI may be borne in the scheduling block allocated by the eNB to the UE2. Certainly, this is not limited in this embodiment of the present application. The first DCI and the second DCI are borne on other channels.

Step 304: The UE1 generates the first index parameter, and the UE2 generates the third index parameter.

A manner in which the UE1 generates the first index parameter is similar to the manner in which the eNB generates the first index parameter of the UE1, and may be as follows: The UE1 maps, onto the first index parameter, a location sequence number of a scheduling block that is allocated by the eNB to the UE1 in a control channel (such as a PDCCH) and that is in a scheduling block set of the control channel. Referring to FIG. 5, the UE1 may calculate a difference between a location of the scheduling block for the UE1 and a start location of the scheduling block set, and use a difference value onto the first index parameter of the UE1. Specifically, the UE1 may calculate differences between the location of the scheduling block for the UE1 and the start location of the scheduling block set in two dimensions of time and frequency, and then obtain the first index parameter of the UE1 according to difference values calculated in the two dimensions. For example, a location of a scheduling block for UE0 is the start location of the scheduling block set, and is denoted as 0. In this case, the difference, obtained by means of calculation, between the location of the scheduling block for the UE1 and the start location of the scheduling block set is 1, which is used as the first index parameter of the UE1.

A manner in which the UE2 generates the third index parameter is similar to the manner in which the eNB generates the third index parameter of the UE2, and may be as follows: The UE2 maps, onto the third index parameter, a location sequence number of a scheduling block that is allocated by the eNB to the UE2 in a control channel (a PDCCH) and that is in a scheduling block set of the control channel. Details are not described.

Alternatively, a manner in which the UE1 generates the first index parameter may be as follows: According to the preset hash function, the identifier of the UE1 is substituted into the hash function, and the calculation result is mapped onto the first index parameter. Similarly, alternatively, a manner in which the UE2 generates the third index parameter may be as follows: According to the preset hash function, the identifier of the UE2 is substituted into the hash function, and the calculation result is mapped onto the third index parameter.

The hash function is the same as that in step 301. Details are not described herein again.

When generating the first index parameter $i_{UE1}$, the UE1 needs to substitute the identifier (which is represented as UE1_ID) of the UE1 into the hash function. When generating the third index parameter $i_{UE2}$, the UE2 needs to substitute the identifier (which is represented as UE2_ID) of the UE2 into the hash function. That is, $i_{UE1}=f(UE1\_ID)$ mod N, and $i_{UE2}=f(UE2\_ID)$ mod N.

Step 305: The UE1 sends uplink data to the eNB on a time-frequency resource allocated to the UE1, and the UE2 sends uplink data to the eNB on a time-frequency resource allocated to the UE2.

For example, the UE1 may determine, by using control information (such as the first DCI) borne on the scheduling block allocated to the UE1, the time-frequency resource allocated to the UE1. The UE2 may determine, by using control information (such as the second DCI) borne on the scheduling block allocated to the UE2, the time-frequency resource allocated to the UE2.

Step 306: The UE1 determines actual index information (which is represented as p) of the UE1 according to the first index parameter i and the second index parameter j, and the UE2 determines actual index information of the UE2 according to the third index parameter and the fourth index parameter.

The actual index information of the UE1 is used to indicate an index of the target bit location of the UE1 in the ACK/NACK bitmap. The actual index information of the UE2 is used to indicate an index of the target bit location of the UE2 in the ACK/NACK bitmap.

After step 305, the eNB needs to send feedback information to the UE (refer to step 307). The feedback information is borne in the ACK/NACK bitmap. Therefore, the UE needs to first obtain the actual index information in this step to receive ACK/NACK information at a bit location of the UE in the ACK/NACK bitmap.

Figure 7:
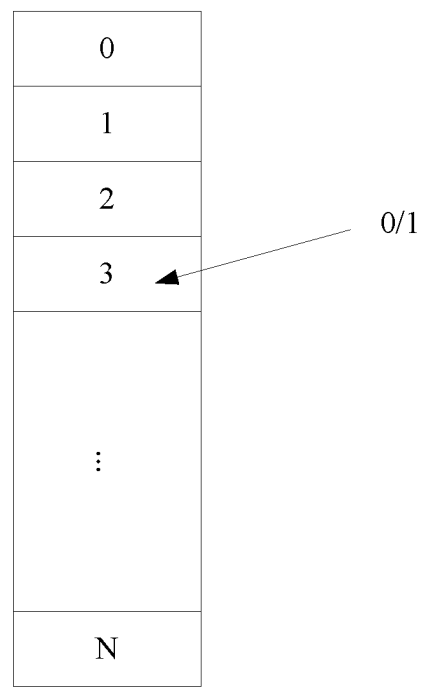
FIG. 7 is a schematic diagram of an ACK/NACK bitmap according to an embodiment of the present application.

FIG. 7 is a schematic diagram of the ACK/NACK bitmap. The ACK/NACK bitmap has N bits. 1 bit is used to represent a bit location of one UE. The UE1 is used as an example. When a bit location corresponding to the UE1 in the ACK/NACK bitmap is 0, it represents that the eNB fails to correctly receive the uplink data sent by the UE1. Otherwise, when a bit location corresponding to the UE1 in the ACK/NACK bitmap is 1, it represents that the eNB correctly receives the uplink data sent by the UE1. Certainly, alternatively, 0 may be used to represent that receiving is correct, and 1 may be used to represent that receiving is incorrect.

The UE1 is used as an example. The first index parameter i is used to indicate an index of a first bit location in the ACK/NACK bitmap. The second index parameter is used to indicate an offset of the index that is of the target bit location of the UE1 and that is relative to the index of the first bit location.

This step may be as follows: The first index parameter i and the second index parameter j are substituted into an operation formula to obtain the actual index information p by means of calculation. The operation formula is $p=(i \pm z \pm k \times j) \bmod N$, where "$\pm$" represents that "+" or "−" may be used. That is, the calculation formula is $p=(i \pm z+k \times j) \bmod N$ or $p=(i \pm z-k \times j) \bmod N$, where N is a quantity of bit locations in the ACK/NACK bitmap, k and z are constants, k is greater than 0 and is usually an integer, and z is greater than or equal to 0 and is usually an integer. In this embodiment of the present application, z is preferably 0.

For example, the calculation formula may further have different representation manners according to values of z and k, and may be as follows:

if $z=0$, and $k=1$, $p=(i \pm j) \bmod N$; or if $z=0$, $p=(i \pm k \times j) \bmod N$; or if $k=1$, $p=(i \pm z+j) \bmod N$, or $p=(i \pm z-j) \bmod N$.

It should be noted that there is a modulo algorithm (a mod algorithm) in each of the foregoing calculation formulas. A person skilled in the art should understand that when a dividend in the mod algorithm is less than N, a calculation result obtained according to the calculation formula without the modulo algorithm is the same as a calculation result obtained according to the calculation formula. For example, when (i±j) is less than N, a calculation result of p=(i±j)mod N is the same as that of p=(i±j). Therefore, essences of the two are the same and shall fall within the protection scope of the present application. Likewise, other calculation formulas in all embodiments of the present application are similar to this, and the modulo operation may not be necessarily performed.

A formula is not limited to the foregoing several operation formulas in this embodiment provided that the first index parameter i and the second index parameter j can be used as inputs, and the actual index information p can be used as an output. For example, i and j may be used as inputs of a function to output p. Alternatively, i and j may be used as inputs of a function to obtain an intermediate parameter, and then the intermediate parameter is used as an input of another function to obtain p.

Similarly, the UE2 may determine the actual index information of the UE2 according to the third index parameter and the fourth index parameter. For a process thereof, refer to the foregoing process. Provided that i in the calculation formula is replaced with the third index parameter of the UE2, and j in the calculation formula is replaced with the fourth index parameter of the UE2, p obtained according to the calculation formula is the actual index information of the UE2.

In a process of performing this step, if the first index parameter of the UE1 is the same as the third index parameter of the UE2, the UE1 and the UE2 are mapped to a same bit location according to the prior art. Consequently, a bit location collision occurs. However, because the second index parameter of the UE1 is different from the fourth index parameter of the UE2, different actual index information may be obtained by using the calculation formula, so that the UE1 and the UE2 are mapped to different bit locations.

It should be noted that a sequence of the steps in this embodiment is merely used as an example. Certainly, this is not limited herein. For example, step 306 may be performed after step 304 and before step 305.

Step 307: After receiving the uplink data sent by each UE, the eNB sends feedback information on a common PDCCH or another downlink control channel or other signaling according to a status of correctly or incorrectly receiving the uplink data, where the feedback information is borne in an ACK/NACK bitmap.

It should be noted that, because sizes of the uplink data sent by the UEs may be different, the eNB may send ACK/NACK information for the n UEs to the UEs by using different ACK/NACK bitmaps.

Step 308: Each UE obtains a bit location of the UE from the ACK/NACK bitmap according to the actual index information of the UE. The bit location of the UE is used as a bit location to be used by the UE, that is, the UE is to receive information by using the bit location.

Specifically, the UE1 obtains the bit location of the UE1 from the ACK/NACK bitmap according to the actual index information of the UE1, so as to receive ACK/NACK information for the UE1 at the bit location of the UE1. The UE2 obtains the bit location of the UE2 from the ACK/NACK bitmap according to the actual index information of the UE2, so as to receive ACK/NACK information for the UE2 at the bit location of the UE2.

A second specific embodiment of the present application provides an information transmission method that may be applied to an uplink scheduling process. The method includes the following steps.

1. An eNB generates a first index parameter of UE1 and a third index parameter of UE2.

In this step, the generated first index parameter of the UE1 is one parameter, and the generated third index parameter of the UE2 is also one parameter.

In this embodiment, an ACK/NACK bitmap has N bit locations. The ACK/NACK bitmap is divided into a first resource subset and a second resource subset. The first resource subset has N1 bit locations, and the second resource subset has N2 bit locations. N is a positive integer and is a quantity of bit locations included in the ACK/NACK bitmap, N1+N2=N, and both N1 and N2 are positive integers.

The first index parameter of the UE1 is used to indicate an index of a bit location in the first resource subset. The third index parameter of the UE2 is used to indicate an index of a bit location in the first resource subset.

For a manner in which the eNB obtains the first index parameter of the UE1 and a manner in which the eNB obtains the third index parameter of the UE2, refer to step 301 in the foregoing embodiment. Details are not described herein again.

2. If the first index parameter is the same as the third index parameter, the eNB sets a second index parameter for the UE1, and sets a fourth index parameter for the UE2.

The second index parameter of the UE1 is used to indicate an index of a bit location in the second resource subset. The fourth index parameter of the UE2 is used to indicate an index of a bit location in the second resource subset.

This step is: if the first index parameter of the UE1 is the same as the third index parameter of the UE2, the second index parameter of the UE1 is set to 0, and the fourth index parameter of the UE2 is set to non-0.

A significance of this step lies in that, after generating the first index parameter of the UE1 and the third index parameter of the UE2, the eNB sets the second index parameter of the UE1 and the fourth index parameter of the UE2 to different values if the first index parameter of the UE1 is the same as the third index parameter of the UE2. Preferably, if the second index parameter of the UE1 is 0, and the fourth index parameter of the UE2 is not 0, the UE1 may determine actual index information of a target bit location of the UE1 in the first resource subset by using only the first index parameter, and the UE2 may determine actual index information of a target bit location of the UE2 in the second resource subset by using only the fourth index parameter. Still optionally, if the second index parameter of the UE1 and the fourth index parameter of the UE2 each are not 0, and are different, the UE1 may determine actual index information of a target bit location of the UE1 in the second resource subset by using the second index parameter, and the UE2 may determine actual index information of a target bit location of the UE2 in the second resource subset by using the fourth index parameter.

Further, the second index parameter of the UE1 and the fourth index parameter of the UE2 each may be set to 0 if the first index parameter of the UE1 is different from the third index parameter of the UE2. In this case, the UE1 may determine actual index information of a target bit location of the UE1 in the first resource subset by using only the first index parameter, and the UE2 may determine actual index information of a target bit location of the UE2 in the first resource subset by using only the third index parameter.

3. The step is the same as step 303, and details are not described herein again.

4. The step is the same as step 304, and details are not described herein again.

5. The step is the same as step 305, and details are not described herein again.

6. The UE1 determines actual index information (which is represented as p) of the UE1 according to the first index parameter i and the second index parameter j, and the UE2 determines actual index information of the UE2 according to the third index parameter and the fourth index parameter.

The UE1 is used as an example. If the second index parameter j of the UE1 is 0, p=i mod N. If the second index parameter j is not 0, p=j mod N. It should be noted that, if i and j are less than N, a modulo operation may not be performed, and an essence is the same as that of the calculation formula.

Likewise, the UE2 may determine the actual index information of the UE2 according to the third index parameter and the fourth index parameter. For a process thereof, refer to the foregoing process. Provided that i in the calculation formula is replaced with the third index parameter of the UE2, and j in the calculation formula is replaced with the fourth index parameter of the UE2, p obtained according to the calculation formula is the actual index information of the UE2.

7. The step is the same as step 307, and details are not described herein again.

8. The step is the same as step 308, and details are not described herein again.

A third specific embodiment of the present application provides an information transmission method that may be applied to an uplink scheduling process. The method includes the following steps.

1. An eNB generates a first index parameter of UE1 and a third index parameter of UE2.

The first index parameter of the UE1 is used to indicate indexes of a bit locations in an ACK/NACK bitmap. The third index parameter of the UE2 is used to indicate indexes of b bit locations in the ACK/NACK bitmap. Each of a and b is an integer greater than or equal to 2 and is less than N; and a and b may be preferably the same, or certainly may be different.

A group including the a bit locations is referred to as a first bit location group. A group including the b bit locations is referred to as a second bit location group. The bit locations included in the first bit location group may be all the same as, or partially the same as, or completely different from those included in the second bit location group.

Optionally, the first index parameter of the UE1 may include a first index sub parameters. Each first index sub parameter is used to indicate an index of a bit location in the a bit locations, that is, used to indicate an index of a bit location in the first bit location group.

In this case, a manner in which the eNB generates the first index parameter of the UE1 may be as follows: The eNB obtains the a first index sub parameters of the UE1 by using a mapping rule. Specifically, according to a preset hash function $f(\cdot)$ (which is represented as $f_2(\cdot)$ in this embodiment of the present application to be distinguished from a hash function in another embodiment), the eNB may substitute an identifier UE1_ID of the UE1 into the hash function $f_2(\cdot)$, and map a calculation result onto the first index parameter. The hash function $f_2(\cdot)$ agreed on by the eNB and the UE1 in advance, $(r_1, r_2, K\ r_a)$ is used to represent the a first index sub parameters of the UE1, and UE1_ID is used to represent the identifier of the UE. In this case, $(r_1, r_2, K\ r_a)=f_2(UE1\_ID)\ mod\ N$ (it should be noted that herein a random values are obtained by using the hash function, and the a first index sub parameters are obtained by performing a modulo operation on the a random values respectively; or there may be no modulo algorithm). The identifier UE1_ID of the UE1 may be one or a combination of multiple of an IMSI, a C-RNTI, an S-TMSI, or the like. It should be noted that an input parameter of the hash function may further include another parameter such as a current radio frame number. This is not limited herein.

Similarly, the third index parameter of the UE2 may include b third index sub parameters. Each third index sub parameter is used to indicate an index of a bit location in the b bit locations, that is, used to indicate an index of a bit location in the second bit location group. For a manner in which the eNB generates the third index parameter of the UE2, refer to the foregoing method. Details are not described herein again.

Optionally, the first index parameter of the UE1 is a group index of the first bit location group. The third index parameter of the UE2 is a group index of the second bit location group.

In this case, a manner in which the eNB obtains the first index parameter of the UE1 may also be as follows: The UE1 maps, onto the group index of the first bit location group of the UE1, a location sequence number of a scheduling block that is allocated to the UE1 in a control channel and that is in a scheduling block set of the control channel. For example, the group index of the first bit location group of the UE1 may be obtained by dividing, by a quantity of bit locations included in the first bit location group, the location sequence number that is of the scheduling block for the UE1 and that is obtained in step 301. Certainly, alternatively, an identifier of the UE1 may be substituted into a preset hash algorithm, and a calculation result is mapped onto the group index of the first bit location group of the UE1.

Similarly, for a manner in which the eNB obtains the third index parameter of the UE2, refer to the foregoing manner. Details are not described herein again.

For example, the group index may be a group sequence number. For example, the ACK/NACK bitmap may have N bit locations that are averagely classified into u groups. Each bit location group includes t (t=N/u) bit locations. In this case, sequence numbers of the u groups are successively 1, 2, . . . , and u, or sequence numbers of the u groups are successively 0, 1, 2, . . . , and u−1. The group sequence numbers may be used as the first index parameter of the UE1 or the third index parameter of the UE2.

2. If the first index parameter is the same as or partially the same as the third index parameter, the eNB sets a second index parameter for the UE1, and sets a fourth index parameter for the UE2.

The second index parameter of the UE1 is used to indicate an index of a first bit location of the a bit locations in the first bit location group. The fourth index parameter of the UE2 is used to indicate an index of a second bit location of the b bit locations in the second bit location group.

This step is specifically: If the first index parameter is the same as or partially the same as the third index parameter, the second index parameter is set for the UE1, and the fourth index parameter is set for the UE2, so that an index that is of the first bit location in the ACK/NACK bitmap and that is determined according to the first index parameter and the second index parameter of the UE1 is different from an index that is of the second bit location in the ACK/NACK bitmap and that is determined according to the third index parameter and the fourth index parameter of the UE2.

Optionally, when the first index parameter of the UE1 may include a first index sub parameters, and the third index parameter of the UE2 includes b third index sub parameters, if all the a first index sub parameters of the UE1 are different from all the b third index sub parameters of the UE2, it indicates that a bit location collision between the UE1 and the UE2 impossibly occurs. In this case, the second index parameter of the UE1 and the fourth index parameter of the UE2 may be randomly set (may be the same or may be different). If the a first index sub parameters of the UE1 are partially the same as or all the same as the b third index sub parameters of the UE2, it indicates that a bit location collision between the UE1 and the UE2 possibly occurs. In this case, for the second index parameter of the UE1 and the fourth index parameter of the UE2, it needs to be ensured that one first index sub parameter corresponding to the second index parameter of the UE1 is different from one third index sub parameter indicated by the fourth index parameter of the UE2.

Optionally, when the first index parameter of the UE1 is the group index of the first bit location group, and the third index parameter of the UE2 is the group index of the second bit location group, the second index parameter of the UE1 and the fourth index parameter of the UE2 need to be set to different values if the first index parameter of the UE1 is the same as the third index parameter of the UE2. Further, if the first index parameter of the UE1 is different from the third index parameter of the UE2, the second index parameter of the UE1 and the fourth index parameter of the UE2 may need to be set to same values or may be set to different values.

For example, the ACK/NACK bitmap may have N bit locations that are averagely classified into u groups. Each bit location group includes t ($t=N/u$) bit locations. Sequence numbers of the t bit locations in one of the groups may be 1, 2, . . . , t, or may be 0, 1, . . . , t−1. The sequence numbers may be used as the second index parameter of the UE1 or the fourth index parameter of the UE2.

3. The step is the same as step 303, and details are not described herein again.

4. The UE1 generates the first index parameter, and the UE2 generates the third index parameter.

For a manner in which the UE1 generates the first index parameter, refer to the manner in which the eNB generates the first index parameter of the UE1. For a manner in which the UE2 generates the third index parameter, refer to the manner in which the eNB generates the third index parameter of the UE2.

5. The step is the same as step 305, and details are not described herein again.

6. The UE1 determines actual index information (which is represented as p) of the UE1 according to the first index parameter i and the second index parameter j, and the UE2 determines actual index information of the UE2 according to the third index parameter and the fourth index parameter.

Specifically, the UE1 determines the index of the first bit location in the ACK/NACK bitmap according to the first index parameter and the second index parameter, and uses the index as the actual index information of the UE1. The UE2 determines the index of the second bit location in the ACK/NACK bitmap according to the third index parameter and the fourth index parameter, and uses the index as the actual index information of the UE2.

Optionally, when the first index parameter of the UE1 may include the a first index sub parameters, and the third index parameter of the UE2 includes the b third index sub parameters, the UE1 determines, from the a first index sub parameters ($r_1$, $r_2$, K $r_a$) of the UE1, a first index sub parameter r corresponding to the second index parameter, so as to determine p, where $p=r \bmod N$ (it should be noted that a modulo operation may not be performed). For example, if the first index sub parameter of the UE1 that is corresponding to the second index parameter of the UE1 is $r_2$, $p=r_2 \bmod N$. Similarly, the UE2 may determine, from the b third index sub parameters of the UE2, a third index sub parameter corresponding to the fourth index parameter, so as to determine the actual index information of the UE2. A modulo operation may not be performed in the foregoing formula.

Optionally, when the first index parameter of the UE1 is the group index of the first bit location group, the UE1 determines the actual index information p of the UE1 through calculation according to the group index of the first bit location group and the second index parameter of the UE1.

For example, the ACK/NACK bitmap may have N bit locations that are averagely classified into u groups. Each bit location group includes t ($t=N/u$) bit locations. In this case, sequence numbers of the u groups are successively 1, 2, . . . , and u, and sequence numbers of the t bit locations in one of the groups are 1, 2, . . . , and t. In this case, the actual index information of the UE1 $p=(i-1)*t+j$, and it indicates that a target bit location of the UE1 is at the $p^{th}$ bit location in the ACK/NACK bitmap.

For another example, the ACK/NACK bitmap may have N bit locations that are averagely classified into u groups. Each bit location group includes t ($t=N/u$) bit locations. In this case, sequence numbers of the u groups are successively 0, 1, . . . , and u−1, and sequence numbers of the t bit locations in one of the groups are 1, 2, . . . , and t. In this case, the actual index information of the UE1 $p=i*t+j$, and it indicates that a target bit location of the UE1 is at the $p^{th}$ bit location in the ACK/NACK bitmap.

For example, the ACK/NACK bitmap may have N bit locations that are averagely classified into u groups. Each bit location group includes t ($t=N/u$) bit locations. In this case, sequence numbers of the u groups are successively 1, 2, . . . , and u, and sequence numbers of the t bit locations in one of the groups are 0, 1, . . . , and t−1. In this case, the actual index information of the UE1 $p=(i-1)*t+j+1$, and it indicates that a target bit location of the UE1 is at the $p^{th}$ bit location in the ACK/NACK bitmap.

For example, the ACK/NACK bitmap may have N bit locations that are averagely classified into u groups. Each bit location group includes t ($t=N/u$) bit locations. In this case, sequence numbers of the u groups are successively 0, 1, . . . , and u−1, and sequence numbers of the t bit locations in one of the groups are 0, 1, . . . , and t−1. In this case, the actual index information of the UE1 $p=i*t+j+1$, and it indicates that a target bit location of the UE1 is at the $p^{th}$ bit location in the ACK/NACK bitmap.

Optionally, when the third index parameter of the UE2 is the group index of the second bit location group, the UE2 determines the actual index information of the UE2 through calculation according to the group index of the second bit location group and the second index parameter of the UE2. For details, refer to the foregoing method. Preferably, for a group division manner, a group sequence number, and sequence numbers of bit locations in each group, the UE1 uses a same rule as the UE2.

7. The step is the same as step 307, and details are not described herein again.

8. The step is the same as step 308, and details are not described herein again.

Another embodiment of the present application provides an information transmission method to describe the foregoing solution in detail. This embodiment is applied to a downlink scheduling process in a CIoT system. A network side device is an eNodeB eNB. A radio communication air interface resource set is an orthogonal sequence code resource set. The orthogonal sequence code resource set includes N orthogonal sequence code resources (that is, a length of the radio communication air interface resource set is N). A length of each orthogonal sequence code resource is L. Any orthogonal sequence code resource is $S_i=\{a_{i1}, a_{i2}, \Lambda\ a_{iL}\}$, where N≥i≥1, and L≥N. Any element in an orthogonal sequence code may be a real number or certainly may be a complex number, and each orthogonal sequence code resource is used as a radio communication air interface resource. It should be noted that any two orthogonal sequence codes in the orthogonal sequence code resource set should be mutually orthogonal. For example, any two sequences in an orthogonal rule need to meet the following condition:

when and only when i=j, $S_i{}^*S_j{}^*=\Sigma_{x=1}{}^L a_{ix}a_{jx}{}^*\neq 0$, where N≥i, and j≥1; or when i≠j, $S_i{}^*S_j{}^*=\Sigma_{x=1}{}^L a_{ix}a_{jx}{}^*=0$, where the superscript * represents using a conjugate operation.

Transmit signals of multiple UEs may be transmitted on a same time and frequency resource by using a feature of an orthogonal sequence code. Therefore, at least one different orthogonal sequence code resource needs to be allocated to transmit signals of different UEs. After receiving the transmit signals of the multiple UEs, the eNB multiplies a received resultant signal by each of multiple orthogonal sequence code resources corresponding to the senders UEs, and then may obtain a transmit signal of each UE from the resultant signal by means of parsing.

For the CIoT system architecture, still refer to FIG. 4. The CIoT system includes an eNB and multiple UEs in a control range of the eNB. The eNB may simultaneously schedule a maximum of N UEs. Currently, n (N≥n≥2) UEs communicate with the eNB (that is, the eNB schedules data transmission of the n UEs). For example, both UE1 and UE2 communicate with the eNB. Some other UEs, such as UEx, currently do not communicate with the eNB.

Figure 8:
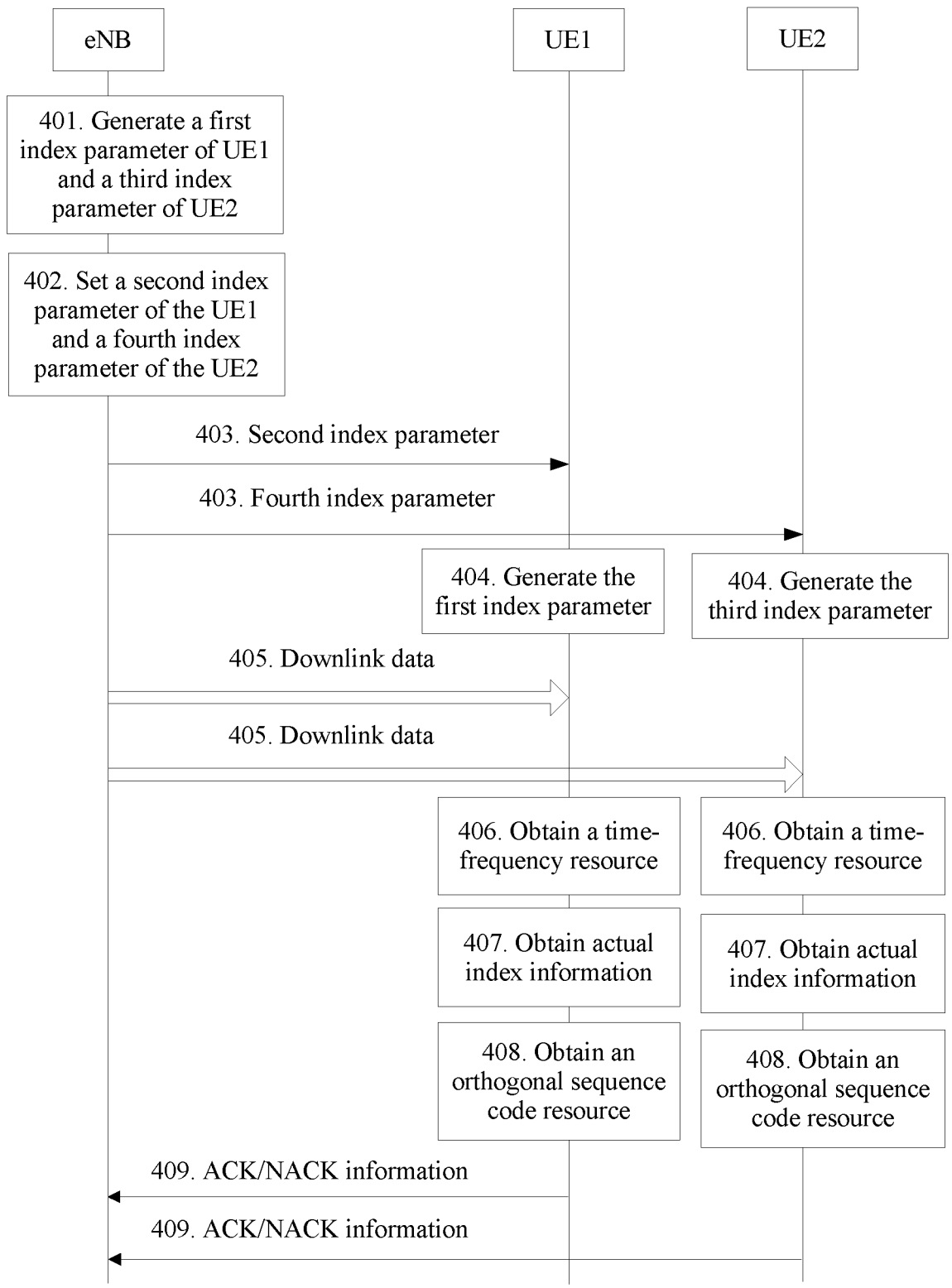
FIG. 8 is a second flowchart of an air interface resource indication method according to an embodiment of the present application.

FIG. 8 is a flowchart of an information transmission method according to a first specific embodiment of the present application. The information transmission method is a downlink scheduling process. The information transmission method may include the following steps.

Step 401: An eNB generates a first index parameter of UE1 and a third index parameter of UE2.

In this step, the generated first index parameter of the UE1 is one parameter and is used to indicate an index of a first orthogonal sequence code resource in an orthogonal sequence code resource set, and the generated third index parameter of the UE2 is also one parameter and is used to indicate an index of a second orthogonal sequence code resource in the orthogonal sequence code resource set.

A specific process of performing this step is merely as follows: A scheduling block allocated to the UE1 is used to schedule a time-frequency resource for sending downlink data to the UE1, and a scheduling block allocated to the UE2 is used to schedule a time-frequency resource for sending downlink data to the UE2. For other details, refer to description in step 301.

Step 402: If the first index parameter is the same as the third index parameter, the eNB sets a second index parameter for the UE1, and sets a fourth index parameter for the UE2.

In this step, except that an air interface resource is an orthogonal sequence code resource, for other details, refer to description in step 302.

Step 403: The eNB sends the second index parameter to the UE1, and the eNB sends the fourth index parameter to the UE2. Correspondingly, the UE1 receives the second index parameter, and the UE2 receives the fourth index parameter.

Optionally, the eNB sends first DCI to the UE1 by using a PDCCH. The first DCI carries the second index parameter. Certainly, the first DCI may further include information for the UE1, such as a size of a downlink data transmission block or a modulation and coding scheme for data transmission. Likewise, the eNB sends second DCI to the UE2 by using a PDCCH. The second DCI carries the fourth index parameter. Certainly, the second DCI may further include information for the UE2, such as a size of a downlink data transmission block or a modulation and coding scheme for data transmission.

Step 404: The UE1 generates the first index parameter, and the UE2 generates the third index parameter.

In this step, except that an air interface resource is an orthogonal sequence code resource, for other details, refer to step 304.

Step 405: The UE1 receives, on a time-frequency resource allocated to the UE1, downlink data sent by the eNB to the UE1, and the UE2 receives, on a time-frequency resource allocated to the UE2, downlink data sent by the eNB to the UE2.

Step 406: Each UE obtains a time-frequency resource for feeding back ACK/NACK information to the eNB.

Specifically, each UE may determine, by using control information or other control signaling in the scheduling block allocated by the eNB to the UE, or by using a pre-configured mapping rule between the time-frequency resource for receiving the downlink data and the time-frequency resource for sending the ACK/NACK information, the time-frequency resource for sending the ACK/NACK information.

For any two UEs (the UE1 and the UE2), if the UE2 and the UE1 need to send information on a same time-frequency resource, the time-frequency resources obtained by the two in this step for sending the ACK/NACK information are the same.

Sequence numbers of the steps do not represent a sequence, and a person skilled in the art may perform corresponding adjustment according to an actual requirement.

Step 407: The UE1 determines actual index information (which is represented as p) of the UE1 according to the first index parameter i and the second index parameter j, and the UE2 determines actual index information of the UE2 according to the third index parameter and the fourth index parameter.

In this step, except that an air interface resource is an orthogonal sequence code resource, for other details, refer to description in step 306.

Step 408: Each UE obtains an orthogonal sequence code resource for the UE according to the actual index information of the UE, where the orthogonal sequence code resource for the UE is used as an orthogonal sequence code resource to be used by the UE, that is, the UE is to send information by using the orthogonal sequence code resource.

Specifically, the UE1 may obtain the orthogonal sequence code resource for the UE1 from the orthogonal sequence code resource set according to the actual index information of the UE1, so that the UE1 can send, on the time-frequency resource obtained in step 405, the ACK/NACK information of the UE1 by using the orthogonal sequence code resource for the UE1. The ACK/NACK information of the UE1 is used to indicate whether the UE1 correctly receives the downlink data sent by the eNB.

Likewise, the UE2 may obtain the orthogonal sequence code resource for the UE2 from the orthogonal sequence code resource set according to the actual index information of the UE2, so that the UE2 can send, on the time-frequency resource obtained in step 405, the ACK/NACK information of the UE2 by using the orthogonal sequence code resource for the UE2. The ACK/NACK information of the UE2 is used to indicate whether the UE2 correctly receives the downlink data sent by the eNB.

Step 409: The eNB receives a signal on the time-frequency resource on which each UE feeds back the ACK/NACK information, and obtains, by means of parsing, the information sent by each UE.

Specifically, multiple UEs may feed back ACK/NACK information on a same time-frequency resource. In this case, a signal received by the eNB on the time-frequency resource bears the ACK/NACK information of the multiple UEs. To learn of ACK/NACK information of each UE, the eNB needs to parse the signal received by the eNB.

For example, it is assumed that currently, only the UE1 and the UE2 send transmit signals to the eNB on a same time-frequency resource according to the foregoing method. The transmit signal of the UE1 is $W_1$, a used orthogonal sequence code is $S_1$, and $W_1$ bears ACK/NACK information that the UE1 is to feed back. The transmit signal of the UE2 is $W_2$, a used orthogonal sequence code is $S_2$, and $W_2$ bears ACK/NACK information that the UE2 is to feed back.

In this case, a signal received by the eNB on the time-frequency resource is:

$r = h_1 W_1 S_1 + h_2 W_2 S_2 + n$, where $h_1$ and $h_2$ are respectively channels used by the UE1 and the UE2, and n is a noise.

The eNB obtains, by means of parsing and by using an orthogonal sequence code $S_1^*$, the signal sent by the UE1. If the noise is ignored, $$r^* S_1^* = h_1 W_1 S_1^* S_1^* + h_2 W_2 S_2^* S_1^* + n^* S_1^* = h_1 W_1 S_1^* S_1^* + n^* S_1^* \approx h_1 W_1 S_1^* S_1^*$$

Because $h_1$ and $S_1$ are known, and $S_1$ and $S_1^*$ are conjugate complex number sequences, $W_1$ may be determined, so that the ACK/NACK information that is fed back by the UE1 and borne in the $W_1$ is obtained.

Likewise, the eNB obtains, by means of parsing and by using an orthogonal sequence code $S_2^*$, the signal sent by the UE2. If the noise is ignored, $$r^* S_2^* \approx h_2 W_2 S_2^* S_2^*$$

Because $h_2$ and $S_2$ are known, and $S_2$ and $S_2^*$ are conjugate complex number sequences, $W_2$ may be determined, so that the ACK/NACK information that is fed back by the UE2 and borne in the $W_2$ is obtained.

An information transmission method provided in a second specific embodiment of the present application is applied to a downlink scheduling process. For steps included in the information transmission method, refer to the foregoing embodiment. A method for obtaining a first index parameter and a second index parameter is different from that in the foregoing embodiment. Specifically, in this embodiment, for the method for obtaining the first index parameter and the second index parameter, refer to the second specific embodiment applied to the uplink scheduling process. Details are not described herein again.

An information transmission method provided in a third specific embodiment of the present application is applied to a downlink scheduling process. For steps included in the information transmission method, refer to the first specific embodiment. Only a method for obtaining a first index parameter and a second index parameter is different from that in the first specific embodiment. Specifically, in this embodiment, for the method for obtaining the first index parameter and the second index parameter, refer to the third specific embodiment applied to the uplink scheduling process. Details are not described herein again.

Another embodiment of the present application provides an information transmission method to describe the foregoing solution in detail. This embodiment is applied to a downlink scheduling process in a CIoT system. A network side device is an eNodeB eNB. A radio communication air interface resource set is an orthogonal sequence code resource set including a first resource subset and a second resource subset. The first resource subset includes N1 orthogonal sequence code resources, and any two orthogonal sequence codes should be mutually orthogonal. The second resource subset includes N2 orthogonal sequence code resources, and any two orthogonal sequence codes should be mutually orthogonal.

The first resource subset is used as an example. A length of each orthogonal sequence code resource in the first resource subset is L. Any orthogonal sequence code resource is $S_i = \{a_{i1}, a_{i2}, \Lambda\ a_{iL}\}$, where $N1 \geq i \geq 1$, and $L \geq N1$. Any element in an orthogonal sequence code may be a real number or certainly may be a complex number, and each orthogonal sequence code resource is used as a radio communication air interface resource. Any two sequences in the first resource subset need to meet the following condition:

when and only when $i=j$, $S_i^* S_j^* = \sum_{x=1}^{L} a_{ix} a_{jx}^* \neq 0$, where $N1 \geq i$, and $j \geq 1$; or when $i \neq j$, $S_i^* S_j^* = \sum_{x=1}^{L} a_{ix} a_{jx}^* = 0$, where the superscript * represents using a conjugate operation.

For a condition that any two orthogonal sequence codes in the second resource subset need to meet, refer to the foregoing description.

Based on this, an information transmission method provided in a fourth specific embodiment of the present application is applied to the downlink scheduling process, and may include the following steps.

1. The eNB generates a first index parameter of UE1 and a third index parameter of UE2.

In this step, the generated first index parameter of the UE1 is one parameter and is used to indicate an index of a first target orthogonal sequence code resource in the first resource subset, and the generated third index parameter of the UE2 is also one parameter and is used to indicate an index of a third target orthogonal sequence code resource in the first resource subset.

A specific process of this step may be performed by using any one of the implicit mapping methods described above. Details are not described herein again. It should be emphatically noted that if the first index parameter of the UE1 is to be obtained by using a hash function, an identifier of the UE1 may be substituted into the hash function to obtain a random number, and then a mod N operation or a mod N1 operation is performed on the random number to obtain the first index parameter of the UE1. If the third index parameter of the UE2 is to be obtained by using a hash function, an identifier of the UE2 may be substituted into the hash function to obtain a random number, and then a mod N operation or a mod N2 operation is performed on the random number to obtain the third index parameter of the UE2.

2. If the first index parameter is the same as the third index parameter, the eNB sets a second index parameter for the UE1, and sets a fourth index parameter for the UE2.

The second index parameter of the UE1 is used to indicate an index of a second target orthogonal sequence code resource in the second resource subset. The fourth index parameter of the UE2 is used to indicate an index of a fourth target orthogonal sequence code resource in the second resource subset.

This step is: if the first index parameter is the same as the third index parameter, the second index parameter is set for the UE1, and the fourth index parameter is set for the UE2, where the second index parameter is different from the fourth index parameter.

3. The eNB sends the second index parameter to the UE1, and the eNB sends the fourth index parameter to the UE2. Correspondingly, the UE1 receives the second index parameter, and the UE2 receives the fourth index parameter.

Optionally, the eNB sends first DCI to the UE1 by using a PDCCH. The first DCI carries the second index parameter. Certainly, the first DCI may further include information for the UE1, such as a size of a downlink data transmission block or a modulation and coding scheme for data transmission. Likewise, the eNB sends second DCI to the UE2 by using a PDCCH. The second DCI carries the fourth index parameter. Certainly, the second DCI may further include information for the UE2, such as a size of a downlink data transmission block or a modulation and coding scheme for data transmission.

4. The UE1 generates the first index parameter, and the UE2 generates the third index parameter.

For a manner in which the UE1 generates the first index parameter, refer to a manner in which the eNB generates the first index parameter. For a manner in which the UE2 generates the third index parameter, refer to a manner in which the eNB generates the third index parameter.

5. The UE1 receives, on a time-frequency resource allocated to the UE1, downlink data sent by the eNB to the UE1, and the UE2 receives, on a time-frequency resource allocated to the UE2, downlink data sent by the eNB to the UE2.

6. Each UE obtains a time-frequency resource for feeding back ACK/NACK information to the eNB.

Specifically, each UE may determine, by using control information or other control signaling in a scheduling block allocated by the eNB to the UE, or by using a pre-configured mapping rule between the time-frequency resource for receiving the downlink data and the time-frequency resource for sending the ACK/NACK information, the time-frequency resource for sending the ACK/NACK information.

For any two UEs (the UE1 and the UE2), if the UE2 and the UE1 need to send information on a same time-frequency resource, the time-frequency resources obtained by the two in this step for sending the ACK/NACK information are the same.

Sequence numbers of the steps do not represent a sequence, and a person skilled in the art may perform corresponding adjustment according to an actual requirement.

7. The UE1 determines actual index information (which is represented as p) of the UE1 according to the first index parameter i and the second index parameter j, and the UE2 determines actual index information of the UE2 according to the third index parameter and the fourth index parameter.

The UE1 determines first actual index information p1 according to the first index parameter, where $p1 = i \mod N$ (a modulo operation may not be performed), and the first actual index information is used to indicate an index of the first target orthogonal sequence code resource in the orthogonal sequence code resource set; and determines second actual index information p2 according to the second index parameter, where $p2 = j \mod N$ (a modulo operation may not be performed), and the second actual index information is used to indicate an index of the second orthogonal sequence code resource in the orthogonal sequence code resource set.

For a manner in which the UE2 determines the actual index information of the UE2 according to the third index parameter and the fourth index parameter, refer to the foregoing method.

8. Each UE obtains an orthogonal sequence code resource for the UE according to the actual index information of the UE, where the orthogonal sequence code resource for the UE is used as an orthogonal sequence code resource to be used by the UE, that is, the UE is to send information by using the orthogonal sequence code resource.

Specifically, the UE1 may obtain the first target orthogonal sequence code resource for the UE1 from the first resource subset according to the first actual index information p1 of the UE1, and obtain the second target orthogonal sequence code resource for the UE1 from the second resource subset according to the second actual index information p2 of the UE1, so that the UE1 can send, on the time-frequency resource obtained by the UE1, the ACK/NACK information of the UE1 by using the first target orthogonal sequence code resource and the second target orthogonal sequence resource for the UE1. The ACK/NACK information of the UE1 is used to indicate whether the UE1 correctly receives the downlink data sent by the eNB. Specifically, a is used to represent data that the UE1 actually needs to send. In this case, a signal finally sent by the UE1 is $a*S1_i*S2_j$, where $S1_i$ is the first target orthogonal sequence code resource in the first resource subset, and $S2_j$ is the second target orthogonal sequence code resource in the second resource subset.

Likewise, the UE2 may obtain the third target orthogonal sequence code resource for the UE2 from the first resource subset according to third actual index information of the UE2, and obtain the fourth target orthogonal sequence code resource for the UE2 from the second resource subset according to fourth actual index information of the UE2, so that the UE2 can send, on the time-frequency resource obtained by the UE2, the ACK/NACK information of the UE2 by using the third target orthogonal sequence code resource and the fourth target orthogonal sequence resource for the UE2. The ACK/NACK information of the UE2 is used to indicate whether the UE2 correctly receives the downlink data sent by the eNB.

9. The eNB receives a signal on the time-frequency resource on which each UE feeds back the ACK/NACK information, and obtains, by means of parsing, the information sent by each UE.

Figure 9:
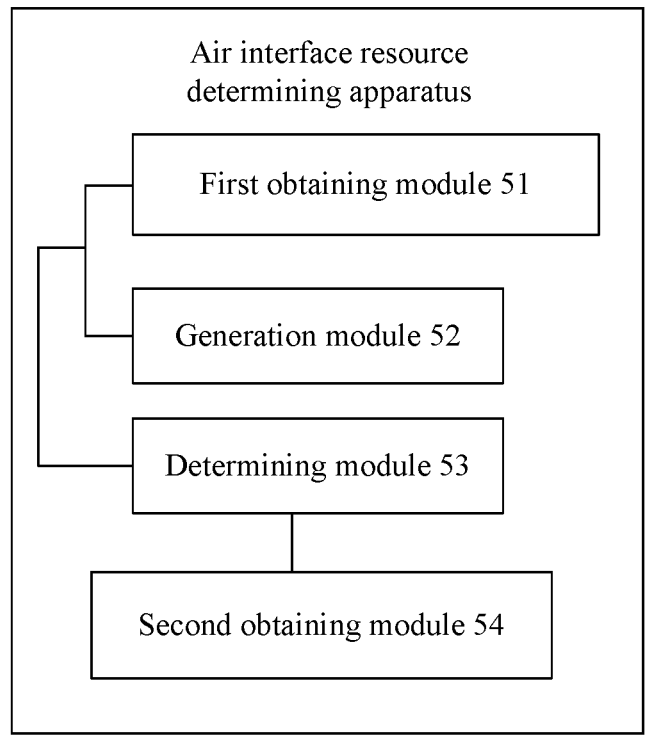
FIG. 9 is a block diagram of an air interface resource determining apparatus according to an embodiment of the present application.

As shown in FIG. 9, an embodiment of the present application further provides an air interface resource determining apparatus that is configured to implement the foregoing air interface resource determining method. The apparatus includes:

a first obtaining module 51, configured to obtain a second index parameter j sent by a network side device by using a control channel;

a generation module 52, configured to generate a first index parameter i according to a preset mapping rule, where the first index parameter is used to indicate an index of at least one air interface resource in an air interface resource set configured by the network side device;

a determining module 53, configured to determine actual index information p according to the first index parameter and the second index parameter, where the actual index information is used to indicate an index of a target air interface resource in the air interface resource set; and a second obtaining module 54, configured to: obtain the target air interface resource from the air interface resource set according to the actual index information, and use the target air interface resource as an air interface resource to be used by the user equipment.

According to the air interface resource determining apparatus provided in this embodiment of the present application, the actual index information of the user equipment is determined by using the two index parameters (including the first index parameter and the second index parameter). In this way, only when two index parameters of a user equipment are all the same as two index parameters of another user equipment, actual index information of the different user equipments is the same, and consequently, air interface resources for the different user equipments that are determined according to the actual index information are in collision. When two index parameters of user equipment are not all the same as two index parameters of another user equipment, actual index information is prevented from being the same, or a probability that actual index information is the same is extremely low. Compared with a prior-art solution in which an air interface resource is determined by using only one index parameter, in a solution provided in this embodiment of the present application, a probability that two index parameters of a user equipment are all the same as two index parameters of another user equipment is lower, so that a probability that actual index information of the different user equipments is the same is lower. Therefore, a probability of collision between air interface resources obtained according to the actual index information can be reduced.

In an optional solution, when the first index parameter is used to indicate an index of a first air interface resource in the air interface resource set, the second index parameter is used to indicate an offset of the index of the target air interface resource relative to the index of the first air interface resource.

The determining module 53 is configured to obtain the actual index information by means of calculation according to a formula $p=(i\pm z\pm k\times j) \bmod N$, where N is a quantity of air interface resources in the air interface resource set, and k and z are constants.

In an optional solution, when the air interface resource set includes a first resource subset and a second resource subset, and the first index parameter is used to indicate an index of an air interface resource in the first resource subset, the second index parameter is used to indicate an index of an air interface resource in the second resource subset.

The determining module 53 is configured to: if the second index parameter j is 0, determine that $p=i \bmod N$; or if the second index parameter j is not 0, determine that $p=j \bmod N$, where N is a quantity of air interface resources in the air interface resource set.

In an optional solution, when the air interface resource set includes an air interface resource group including a air interface resources, and the first index parameter is used to indicate indexes of the a air interface resources in the air interface resource set, where a is an integer greater than or equal to 2, the second index parameter is used to indicate an index of a first air interface resource in the a air interface resources that is in the air interface resource group.

The determining module 53 is configured to: determine an index of the first air interface resource in the air interface resource set according to the first index parameter and the second index parameter, and use the index as the actual index information.

In an optional solution, the first index parameter includes a first index sub parameters, and each first index sub parameter is used to indicate an index of one of the a air interface resources.

The determining module 53 is configured to determine, from the a first index sub parameters, a first index sub parameter r corresponding to the second index parameter, so as to determine p, where $p=r \bmod N$, and N is a quantity of air interface resources in the air interface resource set.

In an optional solution, the first index parameter is a group index of the air interface resource group. The determining module 53 is configured to obtain the actual index information according to the group index of the air interface resource group and the second index parameter.

In an optional solution, when the air interface resource set includes a first resource subset and a second resource subset, and the first index parameter is used to indicate an index of an air interface resource in the first resource subset, the second index parameter is used to indicate an index of an air interface resource in the second resource subset.

The determining module 53 is configured to: determine first actual index information p1 according to the first index parameter, where $p1=i \bmod N$, and the first actual index information is used to indicate an index of a first target air interface resource in the air interface resource set; and determine second actual index information p2 according to the second index parameter, where $p2=j \bmod N$, the second actual index information is used to indicate an index of a second target air interface resource in the air interface resource set, and N is a quantity of air interface resources in the air interface resource set.

In an optional solution, the generation module 52 is configured to:

map, onto the first index parameter, a location sequence number of a scheduling block that is in a scheduling block set of the control channel and allocated to the user equipment in the control channel; or according to a preset hash function, substitute an identifier of the user equipment into the hash function, and map a calculation result onto the first index parameter. Further, the generation module 52 may be configured to: according to the preset hash function, substitute the identifier UE_ID of the user equipment into the hash function, and map the calculation result onto the first index parameter, where $i=f(UE\_ID) \bmod N$, $f(\bullet)$ is the hash function, and N is a quantity of air interface resources in the air interface resource set.

In an optional solution, the radio communication air interface resource includes any one or a combination of multiple of:

a time resource; or a frequency resource; or an orthogonal sequence code resource.

In an optional solution, the time resource includes a bit location in a bitmap.

In an optional solution, the second index parameter is included in downlink control information DCI transmitted by using a physical downlink control channel PDCCH.

It should be noted that the air interface resource determining apparatus in this embodiment may be a user equipment, or may be a device, in a user equipment, that performs the foregoing functions. The first obtaining module 51 may be an interface circuit, on the user equipment, that has a receiving function, for example, a receiver or an information receiving interface. The generation module 52, the determining module 53, and the second obtaining module 54 may be processors that are individually disposed; or may be integrated into a processor of the user equipment for implementation; or may be stored in a memory of the user equipment in a form of program code, and functions of the generation module 52, the determining module 53, and the second obtaining module 54 are invoked and performed by a processor of the user equipment. The processor described herein may be a central processing unit (CPU), an application-specific integrated circuit (ASIC), or one or more integrated circuits configured to implement this embodiment of the present application.

Figure 10:
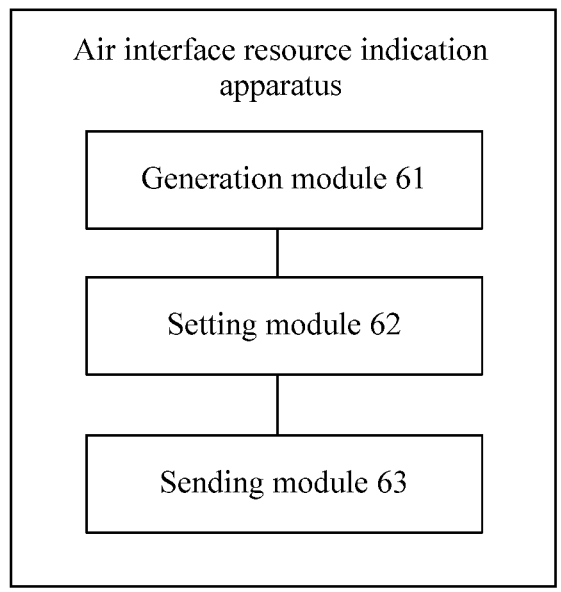
FIG. 10 is a block diagram of an air interface resource indication apparatus according to an embodiment of the present application.

As shown in FIG. 10, an embodiment of the present application provides an air interface resource indication apparatus that is configured to perform the foregoing air interface resource indication method. The apparatus includes:

a generation module 61, configured to generate a first index parameter of a first user equipment and a third index parameter of a second user equipment according to a preset mapping rule, where the first index parameter is used to indicate an index of at least one air interface resource in an air interface resource set configured by the network side device for the first user equipment and the second user equipment, and the third index parameter is used to indicate an index of at least one air interface resource in the air interface resource set;

a setting module 62, configured to set a second index parameter for the first user equipment and set a fourth index parameter for the second user equipment if the first index parameter is the same as or partially the same as the third index parameter, so that actual index information determined according to the first index parameter and the second index parameter is different from actual index information determined according to the third index parameter and the fourth index parameter; and a sending module 63, configured to: send the second index parameter to the first user equipment, and send the fourth index parameter to the second user equipment.

According to the air interface resource indication apparatus provided in this embodiment of the present application, the actual index information of the user equipment is determined by using the two index parameters (including the first index parameter and the second index parameter). In this way, only when two index parameters of a user equipment are all the same as two index parameters of another user equipment, actual index information of the different user equipments is the same, and consequently, air interface resources for the different user equipments that are determined according to the actual index information are in collision. When two index parameters of a user equipment are not all the same as two index parameters of another user equipment, actual index information is prevented from being the same, or a probability that actual index information is the same is extremely low. Compared with a prior-art solution in which an air interface resource is determined by using only one index parameter, in a solution provided in this embodiment of the present application, a probability that two index parameters of a user equipment are all the same as two index parameters of another user equipment is lower, so that a probability that actual index information of the different user equipments is the same is lower. Therefore, a probability of collision between air interface resources obtained according to the actual index information can be reduced.

In an optional solution, when the first index parameter is used to indicate an index of a first air interface resource in the air interface resource set, and the third index parameter is used to indicate an index of a second air interface resource in the air interface resource set, the second index parameter is used to indicate an offset of an index of the target air interface resource of the second user equipment relative to the index of the first air interface resource, and the fourth index parameter is used to indicate an offset of an index of a target air interface resource of the second user equipment relative to the index of the second air interface resource.

The setting module 62 is configured to set the second index parameter for the first user equipment and set the fourth index parameter for the second user equipment if the first index parameter is the same as the third index parameter, where the fourth index parameter is different from the second index parameter.

In an optional solution, when the air interface resource set includes a first resource subset and a second resource subset, the first index parameter is used to indicate an index of an air interface resource in the first resource subset, and the third index parameter is used to indicate an index of an air interface resource in the first resource subset, the second index parameter is used to indicate an index of an air interface resource in the second resource subset, and the fourth index parameter is used to indicate an index of an air interface resource in the second resource subset.

The setting module 62 is configured to set the second index parameter to 0 and set the fourth index parameter to non-0 if the first index parameter is the same as the third index parameter.

In an optional solution, when the first index parameter is used to indicate indexes of a air interface resources in the air interface resource set, and the third index parameter is used to indicate indexes of b air interface resources in the air interface resource set, where a and b are integers greater than or equal to 2, the second index parameter is used to indicate an index of a first air interface resource in the a air interface resources that is in a first air interface resource group, and the fourth index parameter is used to indicate an index of a second air interface resource in the b air interface resources that is in a second air interface resource group, where the first air interface resource group includes the a air interface resources, and the second air interface resource group includes the b air interface resources.

The setting module 62 is configured to set the second index parameter for the first user equipment and set the fourth index parameter for the second user equipment if the first index parameter is the same as or partially the same as the third index parameter, so that an index that is of the first air interface resource in the air interface resource set and that is determined according to the first index parameter and the second index parameter is different from an index that is of the second air interface resource in the air interface resource set and that is determined according to the third index parameter and the fourth index parameter.

In an optional solution, when the air interface resource set includes a first resource subset and a second resource subset, the first index parameter is used to indicate an index of a first target air interface resource in the first resource subset, and the third index parameter is used to indicate an index of a third target air interface resource in the first resource subset, the second index parameter is used to indicate an index of a second target air interface resource in the second resource subset, and the fourth index parameter is used to indicate an index of a fourth target air interface resource in the second resource subset.

The setting module 62 is configured to:

set the second index parameter for the first user equipment and set the fourth index parameter for the second user equipment if the first index parameter is the same as the third index parameter, where the second index parameter is different from the fourth index parameter.

In an optional solution, the radio communication air interface resource includes any one or a combination of multiple of:

a time resource; or a frequency resource; or an orthogonal sequence code resource.

In an optional solution, the time resource includes a bit location in a bitmap.

In an optional solution, the sending module 63 is configured to: send first downlink control information DCI to the first user equipment by using a physical downlink control channel PDCCH, and send second DCI to the second user equipment by using a PDCCH, where the first DCI includes the second index parameter, and the second DCI includes the fourth index parameter.

In an optional solution, the generation module 61 is configured to:

map, onto the first index parameter, a location sequence number of a scheduling block that is in a scheduling block set and allocated by the network side device to the first user equipment; and map, onto the third index parameter, a location sequence number of a scheduling block that is in the scheduling block set and allocated by the network side device to the second user equipment; or according to a preset hash function, substitute an identifier of the first user equipment into the hash function, and map a calculation result onto the first index parameter; and substitute an identifier of the second user equipment into the hash function, and map a calculation result onto the third index parameter. Further, the generation module 61 may be configured to: according to the preset hash function, substitute the identifier UE1_ID of the first user equipment into the hash function, and map the calculation result onto the first index parameter $i_{UE1}$; and substitute the identifier UE2_ID of the second user equipment into the hash function, and map the calculation result onto the third index parameter $i_{UE2}$, where $i_{UE1}=f(UE1\_ID) \bmod N$, $i_{UE2}=f(UE2\_ID) \bmod N$, $f(\cdot)$ is the hash function, and N is a quantity of air interface resources in the air interface resource set.

It should be noted that the air interface resource determining apparatus in this embodiment may be a network side device, or may be a device, in a network side device, that performs the foregoing functions. The sending module 63 may be an interface circuit, on the network side device, that has a sending function, for example, a transmitter or an information sending interface. The generation module 61 and the setting module 62 may be processors that are individually disposed; or may be integrated into a processor of the network side device for implementation; or may be stored in a memory of the network side device in a form of program code, and functions of the generation module 61 and the setting module 62 are invoked and performed by a processor of the network side device. The processor described herein may be a central processing unit (CPU), an application-specific integrated circuit (ASIC), or one or more integrated circuits configured to implement this embodiment of the present application.

Figure 11:
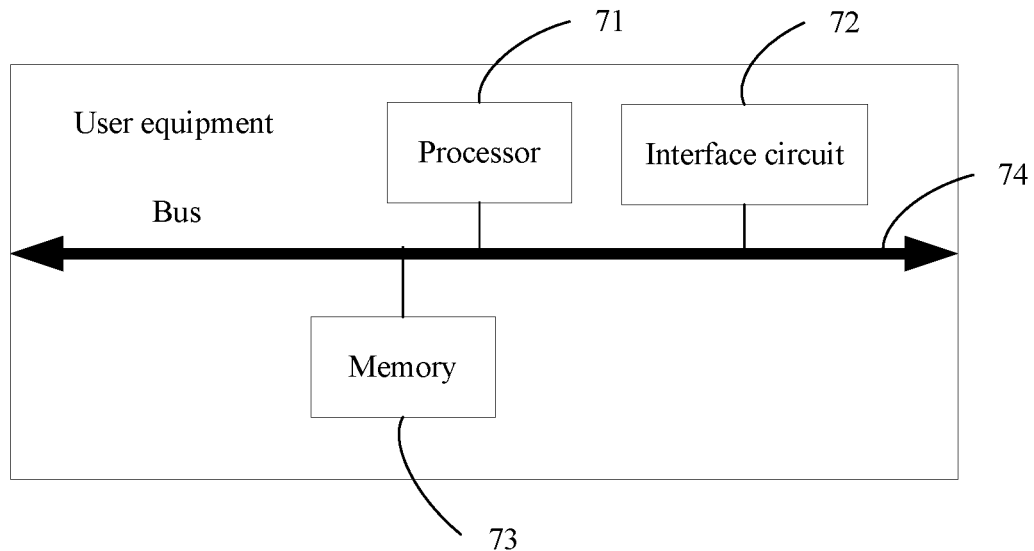
FIG. 11 is a block diagram of a user equipment according to an embodiment of the present application.

As shown in FIG. 11, an embodiment of the present application provides a user equipment that is configured to implement the air interface resource determining method. The user equipment includes a processor 71, an interface circuit 72, a memory 73, and a bus 74. The processor 71, the interface circuit 72, and the memory 73 are connected and complete mutual communication by using the bus 74.

It should be noted that the processor 71 herein may be one processor or may be a collective term of multiple processing elements. For example, the processor may be a central processing unit CPU, may be an application-specific integrated circuit ASIC, or may be one or more integrated circuits configured to implement this embodiment of the present application, for example, one or more microprocessors (DSP) or one or more field programmable gate arrays (FPGA).

The memory 73 may be one storage apparatus or may be a collective term of multiple storage elements, and is configured to store executable program code or a parameter, data, and the like that are required for running an access network management device. In addition, the memory 73 may include a random access memory (RAM), or may include a non-volatile memory (NVRAM), for example, a magnetic disk memory or a flash memory (Flash). The executable program code stored in the memory 73 may be used to implement a function of the processor 71.

The bus 74 may be an industry standard architecture (ISA) bus, a peripheral component interconnect (PCI) bus, an extended industry standard architecture (EISA) bus, or the like. The bus 74 may be classified into an address bus, a data bus, a control bus, and the like. For convenience of representation, the bus is represented by using only one bold line in FIG. 11. However, it does not mean that there is only one bus or only one type of bus.

The interface circuit 72 is configured to obtain a second index parameter j sent by a network side device by using a control channel.

The processor 71 is configured to generate a first index parameter i according to a preset mapping rule. The first index parameter is used to indicate an index of at least one air interface resource in an air interface resource set configured by the network side device.

The processor 71 is further configured to determine actual index information p according to the first index parameter and the second index parameter. The actual index information is used to indicate an index of a target air interface resource in the air interface resource set.

The processor 71 is further configured to: obtain the target air interface resource from the air interface resource set according to the actual index information, and use the target air interface resource as an air interface resource to be used by the user equipment.

In an optional solution, when the first index parameter is used to indicate an index of a first air interface resource in the air interface resource set, the second index parameter is used to indicate an offset of the index of the target air interface resource relative to the index of the first air interface resource.

The processor 71 is configured to obtain the actual index information by means of calculation according to a formula $p=(i \pm z \pm k \times j) \bmod N$, where N is a quantity of air interface resources in the air interface resource set, and k and z are constants.

In an optional solution, when the air interface resource set includes a first resource subset and a second resource subset, and the first index parameter is used to indicate an index of an air interface resource in the first resource subset, the second index parameter is used to indicate an index of an air interface resource in the second resource subset.

The processor 71 is configured to: if the second index parameter j is 0, determine that p=i mod N; or if the second index parameter j is not 0, determine that p=j mod N, where N is a quantity of air interface resources in the air interface resource set.

In an optional solution, when the air interface resource set includes an air interface resource group including a air interface resources, and the first index parameter is used to indicate indexes of the a air interface resources in the air interface resource set, where a is an integer greater than or equal to 2, the second index parameter is used to indicate an index of a first air interface resource in the a air interface resources that is in the air interface resource group.

The processor 71 is configured to: determine an index of the first air interface resource in the air interface resource set according to the first index parameter and the second index parameter, and use the index as the actual index information.

In an optional solution, the first index parameter includes a first index sub parameters, and each first index sub parameter is used to indicate an index of one of the a air interface resources.

The processor 71 is configured to determine, from the a first index sub parameters, a first index sub parameter r corresponding to the second index parameter, so as to determine p, where p=r mod N, and N is a quantity of air interface resources in the air interface resource set.

In an optional solution, the first index parameter is a group index of the air interface resource group.

The processor 71 is configured to obtain the actual index information according to the group index of the air interface resource group and the second index parameter.

In an optional solution, when the air interface resource set includes a first resource subset and a second resource subset, and the first index parameter is used to indicate an index of an air interface resource in the first resource subset, the second index parameter is used to indicate an index of an air interface resource in the second resource subset.

The processor 71 is configured to: determine first actual index information p1 according to the first index parameter, where p1=i mod N, and the first actual index information is used to indicate an index of a first target air interface resource in the air interface resource set; and determine second actual index information p2 according to the second index parameter, where p2=j mod N, the second actual index information is used to indicate an index of a second target air interface resource in the air interface resource set, and N is a quantity of air interface resources in the air interface resource set.

In an optional solution, the processor 71 is configured to:

map, onto the first index parameter, a location sequence number of a scheduling block that is in a scheduling block set of the control channel and allocated to the user equipment in the control channel; or according to a preset hash function, substitute an identifier of the user equipment into the hash function, and map a calculation result onto the first index parameter. Further, the processor 71 may be configured to: according to the preset hash function, substitute the identifier UE_ID of the user equipment into the hash function, and map the calculation result onto the first index parameter, where i=ƒ(UE_ID)mod N ƒ(•) is the hash function, and N is a quantity of air interface resources in the air interface resource set.

In an optional solution, the radio communication air interface resource includes any one or a combination of multiple of:

a time resource; or a frequency resource; or an orthogonal sequence code resource.

In an optional solution, the time resource includes a bit location in a bitmap.

In an optional solution, the second index parameter is included in downlink control information DCI transmitted by using a physical downlink control channel PDCCH.

Figure 12:
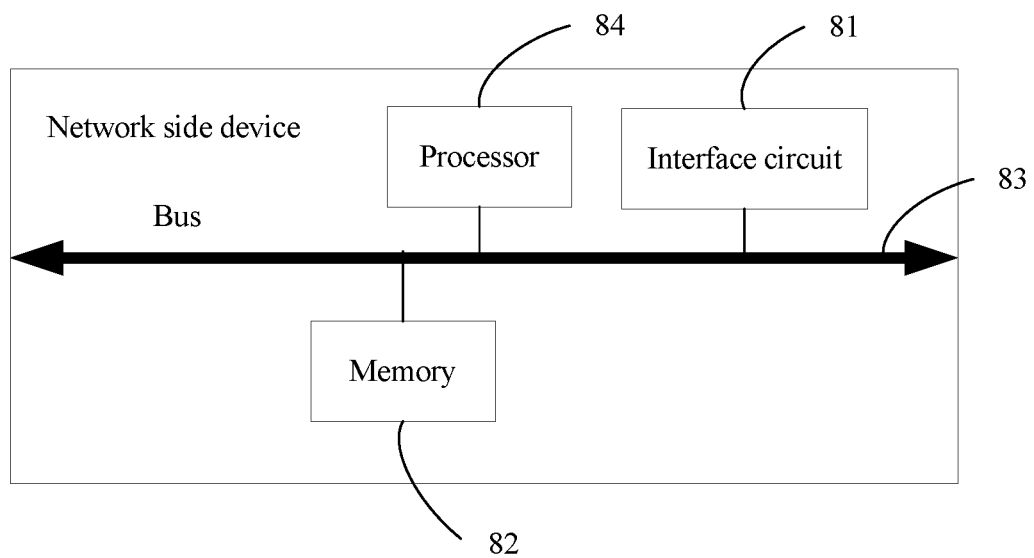
FIG. 12 is a block diagram of a network side device according to an embodiment of the present application.

As shown in FIG. 12, an embodiment of the present application provides a network side device that is configured to implement the air interface resource indication method. The network side device includes an interface circuit 81, a memory 82, a bus 83, and a processor 84. The interface circuit 81, the memory 82, and the processor 84 are connected and complete mutual communication by using the bus 83.

It should be noted that the processor 84 herein may be one processor or may be a collective term of multiple processing elements. For example, the processor may be a central processing unit CPU, may be an application-specific integrated circuit ASIC, or may be one or more integrated circuits configured to implement this embodiment of the present application, for example, one or more microprocessors (DSP) or one or more field programmable gate arrays (FPGA).

The memory 82 may be one storage apparatus or may be a collective term of multiple storage elements, and is configured to store executable program code or a parameter, data, and the like that are required for running an access network management device. In addition, the memory 82 may include a random access memory (RAM), or may include a non-volatile memory (NVRAM), for example, a magnetic disk memory or a flash memory (Flash). The executable program code stored in the memory 82 may be used to implement a function of the processor 84.

The bus 83 may be an industry standard architecture (ISA) bus, a peripheral component interconnect PCI) bus, an extended industry standard architecture (EISA) bus, or the like. The bus 83 may be classified into an address bus, a data bus, a control bus, and the like. For convenience of representation, the bus is represented by using only one bold line in FIG. 12. However, it does not mean that there is only one bus or only one type of bus.

The processor 84 is configured to generate a first index parameter of a first user equipment and a third index parameter of a second user equipment according to a preset mapping rule. The first index parameter is used to indicate an index of at least one air interface resource in an air interface resource set configured by the network side device for the first user equipment and the second user equipment. The third index parameter is used to indicate an index of at least one air interface resource in the air interface resource set.

The processor 84 is configured to set a second index parameter for the first user equipment and set a fourth index parameter for the second user equipment if the first index parameter is the same as or partially the same as the third index parameter, so that actual index information determined according to the first index parameter and the second index parameter is different from actual index information determined according to the third index parameter and the fourth index parameter.

The interface circuit 81 is configured to: send the second index parameter to the first user equipment, and send the fourth index parameter to the second user equipment.

In an optional solution, when the first index parameter is used to indicate an index of a first air interface resource in the air interface resource set, and the third index parameter is used to indicate an index of a second air interface resource in the air interface resource set, the second index parameter is used to indicate an offset of an index of the target air interface resource of the second user equipment relative to the index of the first air interface resource, and the fourth index parameter is used to indicate an offset of an index of a target air interface resource of the second user equipment relative to the index of the second air interface resource.

The processor 84 is configured to set the second index parameter for the first user equipment and set the fourth index parameter for the second user equipment if the first index parameter is the same as the third index parameter, where the fourth index parameter is different from the second index parameter.

In an optional solution, when the air interface resource set includes a first resource subset and a second resource subset, the first index parameter is used to indicate an index of an air interface resource in the first resource subset, and the third index parameter is used to indicate an index of an air interface resource in the first resource subset, the second index parameter is used to indicate an index of an air interface resource in the second resource subset, and the fourth index parameter is used to indicate an index of an air interface resource in the second resource subset.

The processor 84 is configured to set the second index parameter to 0 and set the fourth index parameter to non-0 if the first index parameter is the same as the third index parameter.

In an optional solution, when the first index parameter is used to indicate indexes of a air interface resources in the air interface resource set, and the third index parameter is used to indicate indexes of b air interface resources in the air interface resource set, where a and b are integers greater than or equal to 2, the second index parameter is used to indicate an index of a first air interface resource in the a air interface resources that is in a first air interface resource group, and the fourth index parameter is used to indicate an index of a second air interface resource in the b air interface resources that is in a second air interface resource group. The first air interface resource group includes the a air interface resources, and the second air interface resource group includes the b air interface resources.

The processor 84 is configured to set the second index parameter for the first user equipment and set the fourth index parameter for the second user equipment if the first index parameter is the same as or partially the same as the third index parameter, so that an index that is of the first air interface resource in the air interface resource set and that is determined according to the first index parameter and the second index parameter is different from an index that is of the second air interface resource in the air interface resource set and that is determined according to the third index parameter and the fourth index parameter.

In an optional solution, when the air interface resource set includes a first resource subset and a second resource subset, the first index parameter is used to indicate an index of a first target air interface resource in the first resource subset, and the third index parameter is used to indicate an index of a third target air interface resource in the first resource subset, the second index parameter is used to indicate an index of a second target air interface resource in the second resource subset, and the fourth index parameter is used to indicate an index of a fourth target air interface resource in the second resource subset.

The processor 84 is configured to set the second index parameter for the first user equipment and set the fourth index parameter for the second user equipment if the first index parameter is the same as the third index parameter, where the second index parameter is different from the fourth index parameter.

In an optional solution, the radio communication air interface resource includes any one or a combination of multiple of:

a time resource; or a frequency resource; or an orthogonal sequence code resource.

In an optional solution, the time resource includes a bit location in a bitmap.

In an optional solution, the interface circuit 81 is configured to: send first downlink control information DCI to the first user equipment by using a physical downlink control channel PDCCH, and send second DCI to the second user equipment by using a PDCCH. The first DCI includes the second index parameter, and the second DCI includes the fourth index parameter.

In an optional solution, the processor 84 is configured to:

map, onto the first index parameter, a location sequence number of a scheduling block that is in a scheduling block set and allocated by the network side device to the first user equipment; and map, onto the third index parameter, a location sequence number of a scheduling block that is in the scheduling block set and allocated by the network side device to the second user equipment; or according to a preset hash function, substitute an identifier of the first user equipment into the hash function, and map a calculation result onto the first index parameter; and substitute an identifier of the second user equipment into the hash function, and map a calculation result onto the third index parameter. Further, the processor 84 may be configured to: according to the preset hash function, substitute the identifier UE1_ID of the first user equipment into the hash function, and map the calculation result onto the first index parameter $i_{UE1}$; and substitute the identifier UE2_ID of the second user equipment into the hash function, and map the calculation result onto the third index parameter $i_{UE2}$, where $i_{UE1}=f(UE1\_ID) \bmod N$, $i_{UE2}=f(UE2\_ID) \bmod N$, $f(\cdot)$ is the hash function, and N is a quantity of air interface resources in the air interface resource set.

In addition, a computer readable media (or medium) is further provided, including a computer readable instruction that performs, upon being executed, the following operation: performing operations of the steps in the foregoing method embodiments.

In addition, a computer program product is further provided, including the foregoing computer readable medium.

It should be understood that sequence numbers of the foregoing processes do not mean execution sequences in various embodiments of the present application. The execution sequences of the processes should be determined according to functions and internal logic of the processes, and should not be construed as any limitation on the implementation processes of the embodiments of the present application.

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

It may be clearly understood by a person skilled in the art that, for the purpose of convenient and brief description, for a detailed working process of the foregoing system, apparatus, and unit, refer to a corresponding process in the foregoing method embodiments. Details are not described.

In the several embodiments provided in this application, it should be understood that the disclosed system, device, and method may be implemented in other manners. For example, the described device embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the devices or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. An air interface resource determining method, comprising:

obtaining a second index parameter j from a network side device using a control channel;

generating a first index parameter i according to a preset mapping rule, wherein the first index parameter i indicates an index of at least one air interface resource in an air interface resource set configured by the network side device, wherein the air interface resource set comprises a first resource subset and a second resource subset, and the first index parameter i indicates an index of an air interface resource in the first resource subset, the second index parameter j indicates an index of an air interface resource in the second resource subset;

determining actual index information p according to the first index parameter i and the second index parameter j, wherein the actual index information p indicates an index of a target air interface resource in the air interface resource set, wherein determining the actual index information p according to the first index parameter i and the second index parameter j comprises:

if the second index parameter j is 0, determining that p=i mod N; and if the second index parameter j is not 0, determining that p=j mod N, wherein N is a quantity of air interface resources in the air interface resource set; and obtaining the target air interface resource from the air interface resource set according to the actual index information p, and using the target air interface resource as an air interface resource to be used by a user equipment.

2. The method according to claim 1, wherein the air interface resource set comprises a first resource subset and a second resource subset, and the first index parameter i indicates an index of an air interface resource in the first resource subset, the second index parameter j indicates an index of an air interface resource in the second resource subset; and wherein determining the actual index information p according to the first index parameter i and the second index parameter j comprises:

determining first actual index information p1 according to the first index parameter i, wherein p1=i mod N, and the first actual index information p1 indicates an index of a first target air interface resource in the air interface resource set; and determining second actual index information p2 according to the second index parameter j, wherein p2=j mod N, the second actual index information p2 indicates an index of a second target air interface resource in the air interface resource set, and N is a quantity of air interface resources in the air interface resource set.

3. The method according to claim 1, wherein generating the first index parameter i according to the preset mapping rule comprises:

mapping, onto the first index parameter i, a location sequence number of a scheduling block that is in a scheduling block set of the control channel and allocated to the user equipment in the control channel.

4. The method according to claim 1, wherein the air interface resource comprises any one or a combination of multiple of:

a time resource;

a frequency resource; and an orthogonal sequence code resource.

5. The method according to claim 4, wherein the time resource comprises a bit location in a bitmap.

6. The method according to claim 1, wherein the second index parameter j is comprised in downlink control information (DCI) transmitted using a physical downlink control channel (PDCCH).

7. The method according to claim 1, wherein generating the first index parameter i according to the preset mapping rule comprises:
substituting an identifier of the user equipment into a hash function; and
mapping a calculation result of the hash function onto the first index parameter.

8. An air interface resource indication method, comprising:
generating a first index parameter of a first user equipment and a third index parameter of a second user equipment according to a preset mapping rule, wherein the first index parameter indicates an index of at least one air interface resource in an air interface resource set configured by a network side device for the first user equipment and the second user equipment, and the third index parameter indicates an index of at least one air interface resource in the air interface resource set;
in response to determining that the first index parameter is the same as or partially the same as the third index parameter, setting a second index parameter for the first user equipment and setting a fourth index parameter for the second user equipment, so that actual index information determined according to the first index parameter and the second index parameter is different from actual index information determined according to the third index parameter and the fourth index parameter; and
sending the second index parameter to the first user equipment, and sending the fourth index parameter to the second user equipment;
wherein the air interface resource set comprises a first resource subset and a second resource subset, the first index parameter indicates an index of an air interface resource in the first resource subset, and the third index parameter indicates an index of an air interface resource in the first resource subset, the second index parameter indicates an index of an air interface resource in the second resource subset, and the fourth index parameter indicates an index of an air interface resource in the second resource subset; and
wherein setting the second index parameter for the first user equipment and setting the fourth index parameter for the second user equipment comprises: setting the second index parameter to 0 and setting the fourth index parameter to non-0, wherein the first index parameter is the same as the third index parameter.

9. The method according to claim 8, wherein the air interface resource comprises any one or a combination of multiple of:
a time resource;
a frequency resource; and
an orthogonal sequence code resource.

10. The method according to claim 9, wherein the time resource comprises a bit location in a bitmap.

11. The method according to claim 8, wherein the sending the second index parameter to the first user equipment, and sending the fourth index parameter to the second user equipment comprises:
sending first downlink control information (DCI) to the first user equipment using a physical downlink control channel (PDCCH), and sending second DCI to the second user equipment using a PDCCH, wherein the first DCI comprises the second index parameter, and the second DCI comprises the fourth index parameter.

12. The method according to claim 8, wherein generating the first index parameter of the first user equipment and the third index parameter of the second user equipment according to the preset mapping rule comprises:
mapping, onto the first index parameter, a location sequence number of a scheduling block that is in a scheduling block set and allocated by the network side device to the first user equipment; and
mapping, onto the third index parameter, a location sequence number of a scheduling block that is in the scheduling block set and allocated by the network side device to the second user equipment.

13. The method according to claim 8, wherein generating the first index parameter of the first user equipment and the third index parameter of the second user equipment according to the preset mapping rule comprises:
according to a preset hash function, substituting an identifier of the first user equipment into the hash function, and mapping a calculation result onto the first index parameter; and substituting an identifier of the second user equipment into the hash function, and mapping a calculation result onto the third index parameter.

14. A terminal for determining air interface resource, comprising:
a receiver, configured to obtain a second index parameter from a network side device using a control channel; and
a processor, configured to:
generate a first index parameter according to a preset mapping rule, wherein the first index parameter indicates an index of at least one air interface resource in an air interface resource set configured by the network side device, wherein the air interface resource set comprises A air interface resources, and the first index parameter indicates indexes of the A air interface resources in the air interface resource set, wherein A is an integer greater than or equal to 2, the second index parameter indicates an index of a first air interface resource in the A air interface resources; and
determine actual index information according to the first index parameter and the second index parameter, wherein the actual index information indicates an index of a target air interface resource in the air interface resource set, wherein determining the actual index information according to the first index parameter and the second index parameter comprises determining an index of the first air interface resource in the air interface resource set according to the first index parameter and the second index parameter, and using the index as the actual index information;
wherein the receiver is further configured to obtain the target air interface resource from the air interface resource set according to the actual index information, and use the target air interface resource as an air interface resource to be used by the terminal.

15. The terminal according to claim 14, wherein the first index parameter comprises A first index sub parameters, and each first index sub parameter indicates an index of one of the A air interface resources; and
wherein determining the index of the first air interface resource in the air interface resource set according to the first index parameter and the second index parameter, and using the index as the actual index information comprises:

determining, from the A first index sub parameters, a first index sub parameter r corresponding to the second index parameter, so as to determine p, wherein p=r mod N, and N is a quantity of air interface resources in the air interface resource set.

16. The terminal according to claim 14, wherein the first index parameter is a group index of the air interface resource group; and wherein determining the index of the first air interface resource in the air interface resource set according to the first index parameter and the second index parameter, and using the index as the actual index information comprises:

obtaining the actual index information according to the group index of the air interface resource group and the second index parameter.

17. An air interface resource indication apparatus, comprising:

a processor, configured to:

generate a first index parameter of a first user equipment and a third index parameter of a second user equipment according to a preset mapping rule, wherein the first index parameter indicates an index of at least one air interface resource in an air interface resource set configured by the air interface resource indication apparatus for the first user equipment and the second user equipment, and the third index parameter indicates an index of at least one air interface resource in the air interface resource set; and in response to determining that the first index parameter is the same as or partially the same as the third index parameter, set a second index parameter for the first user equipment and set a fourth index parameter for the second user equipment, so that actual index information determined according to the first index parameter and the second index parameter is different from actual index information determined according to the third index parameter and the fourth index parameter; and a transmitter, configured to send the second index parameter to the first user equipment, and send the fourth index parameter to the second user equipment;

wherein the first index parameter indicates indexes of A air interface resources in the air interface resource set, and the third index parameter indicates indexes of B air interface resources in the air interface resource set, wherein A and B are integers greater than or equal to 2, the second index parameter indicates an index of a first air interface resource in the A air interface resources that is in a first air interface resource group, and the fourth index parameter indicates an index of a second air interface resource in the B air interface resources that is in a second air interface resource group, wherein the first air interface resource group comprises the A air interface resources, and the second air interface resource group comprises the B air interface resources; and wherein setting the second index parameter for the first user equipment and setting the fourth index parameter for the second user equipment comprises:

setting the second index parameter for the first user equipment and setting the fourth index parameter for the second user equipment so that an index that is of the first air interface resource in the air interface resource set and that is determined according to the first index parameter and the second index parameter is different from an index that is of the second air interface resource in the air interface resource set and that is determined according to the third index parameter and the fourth index parameter.

* * * * *